(12) United States Patent
Heap

(10) Patent No.: US 8,224,539 B2
(45) Date of Patent: Jul. 17, 2012

(54) METHOD FOR ALTITUDE-COMPENSATED TRANSMISSION SHIFT SCHEDULING

(75) Inventor: Anthony H. Heap, Ann Arbor, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 942 days.

(21) Appl. No.: 12/251,462

(22) Filed: Oct. 15, 2008

(65) Prior Publication Data
US 2009/0118963 A1    May 7, 2009

Related U.S. Application Data

(60) Provisional application No. 60/984,884, filed on Nov. 2, 2007.

(51) Int. Cl.
*G06F 19/00* (2006.01)
(52) U.S. Cl. .............. 701/54; 701/99; 477/97; 477/107; 180/65.28; 180/60.275
(58) Field of Classification Search .................... 701/51, 701/55, 65, 54, 99; 477/110, 3, 97, 115, 477/107–108; 180/28, 65.28, 65.29, 65.285, 180/65.275
See application file for complete search history.

(56) References Cited

U.S. PATENT DOCUMENTS

| 3,724,292 | A  | * | 4/1973  | Borman .......................... 477/150 |
| 3,999,449 | A  | * | 12/1976 | Chana et al. ..................... 477/30 |
| 4,493,303 | A  | * | 1/1985  | Thompson et al. ............ 123/357 |
| 4,943,921 | A  | * | 7/1990  | Baltusis et al. .................. 701/55 |
| 5,305,663 | A  | * | 4/1994  | Leonard et al. ................ 475/123 |
| 5,309,139 | A  | * | 5/1994  | Austin ............................ 340/462 |
| 5,413,539 | A  | * | 5/1995  | Leonard et al. .................. 475/63 |
| 5,470,288 | A  | * | 11/1995 | Palansky et al. .............. 477/110 |
| 5,475,590 | A  | * | 12/1995 | Palansky et al. ................ 701/67 |
| 5,477,827 | A  | * | 12/1995 | Weisman et al. .............. 123/436 |
| 6,301,529 | B1 | * | 10/2001 | Itoyama et al. .................. 701/22 |
| 6,338,391 | B1 | * | 1/2002  | Severinsky et al. ........ 180/65.23 |
| 6,832,148 | B1 |   | 12/2004 | Bennett |
| 6,868,318 | B1 |   | 3/2005  | Cawthorne |
| 7,128,687 | B2 | * | 10/2006 | Lewis .............................. 477/98 |

(Continued)

FOREIGN PATENT DOCUMENTS

EP     0868005 A2     9/1998
(Continued)

OTHER PUBLICATIONS

An Engine Model for Dynamic Engine Control Development; Dobner, Donald J.; Fruechte, Roger D.; American Control Conference, 1983; Publication Year: 1983 , pp. 73-78.*

(Continued)

*Primary Examiner* — Cuong H Nguyen

(57) ABSTRACT

A powertrain system includes an engine coupled to a transmission operative in one of a plurality of operating range states to transfer power between the engine and an output member. A method for controlling the powertrain system includes monitoring an operator torque request, monitoring barometric pressure and engine input speed to the transmission, determining an achievable range of input power transferable from the engine to the transmission based upon the barometric pressure and the engine input speed, and determining a preferred operating range state for the transmission and a preferred engine operating point at the preferred operating range state based upon the operator torque request and the achievable range of input power.

15 Claims, 14 Drawing Sheets

U.S. PATENT DOCUMENTS

| | | |
|---|---|---|
| 7,154,236 B1 | 12/2006 | Heap |
| 7,254,471 B2 * | 8/2007 | Allen et al. ............... 701/51 |
| 2004/0030469 A1 * | 2/2004 | MacBain ............... 701/22 |
| 2005/0076958 A1 | 4/2005 | Foster |
| 2005/0077867 A1 | 4/2005 | Cawthorne |
| 2005/0077877 A1 | 4/2005 | Cawthorne |
| 2005/0080523 A1 | 4/2005 | Bennett |
| 2005/0080527 A1 | 4/2005 | Tao |
| 2005/0080535 A1 | 4/2005 | Steinmetz |
| 2005/0080537 A1 | 4/2005 | Cawthorne |
| 2005/0080538 A1 | 4/2005 | Hubbard |
| 2005/0080539 A1 | 4/2005 | Hubbard |
| 2005/0080540 A1 | 4/2005 | Steinmetz |
| 2005/0080541 A1 | 4/2005 | Sah |
| 2005/0182526 A1 | 8/2005 | Hubbard |
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0209045 A1 * | 9/2005 | Lewis ............... 477/107 |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0016351 A1 * | 1/2007 | Allen et al. ............... 701/51 |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0255488 A1 * | 11/2007 | Okubo et al. ............... 701/110 |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176705 A1 * | 7/2008 | Tamai et al. ............... 477/3 |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 * | 10/2008 | Lahti et al. ............... 701/103 |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 * | 5/2009 | Heap et al. ............... 477/3 |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 * | 5/2009 | Heap et al. ............... 477/98 |
| 2009/0118091 A1 * | 5/2009 | Lahti et al. ............... 477/100 |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |

| | | |
|---|---|---|
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Hsieh |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118957 A1 | 5/2009 | Heap |
| 2009/0118962 A1 | 5/2009 | Heap |
| 2009/0118963 A1* | 5/2009 | Heap ............................... 701/99 |
| 2009/0118964 A1 | 5/2009 | Snyder |
| 2009/0118969 A1* | 5/2009 | Heap et al. ..................... 701/102 |
| 2009/0118971 A1 | 5/2009 | Heap |
| 2009/0118999 A1 | 5/2009 | Heap |
| 2009/0144002 A1 | 6/2009 | Zettel |
| 2011/0191010 A1* | 8/2011 | Russ et al. .................... 701/108 |

FOREIGN PATENT DOCUMENTS

| | | |
|---|---|---|
| WO | WO-03053733 A1 | 7/2003 |
| WO | WO-2007094278 A1 | 8/2007 |

OTHER PUBLICATIONS

Modeling positive intake value overlap air charge response in camless engines; Gibson, A.; Kolmanovsky, I.; American Control Conference, 2003. Proceedings of the 2003; vol. 1; Digital Object Identifier: 10.1109/ACC.2003.1239112 Publication Year: 2003 , pp. 755-760 vol. 1.*

Estimate of indicated torque from crankshaft speed fluctuations: a model for the dynamics of the IC engine; Rizzoni, G.; Vehicular Technology, IEEE Transactions on; vol. 38 , Issue: 3; Digital Object Identifier: 10.1109/25.45470 Publication Year: 1989 , pp. 168-179.*

A k-step predictive scheme for speed control of diesel driven power plants; Roy, S.; Malik, O.P.; Hope, G.S.; Industry Applications, IEEE Transactions on; vol. 29 , Issue: 2; Digital Object Identifier: 10.1109/28.216549 Publication Year: 1993 , pp. 389-396.*

* cited by examiner

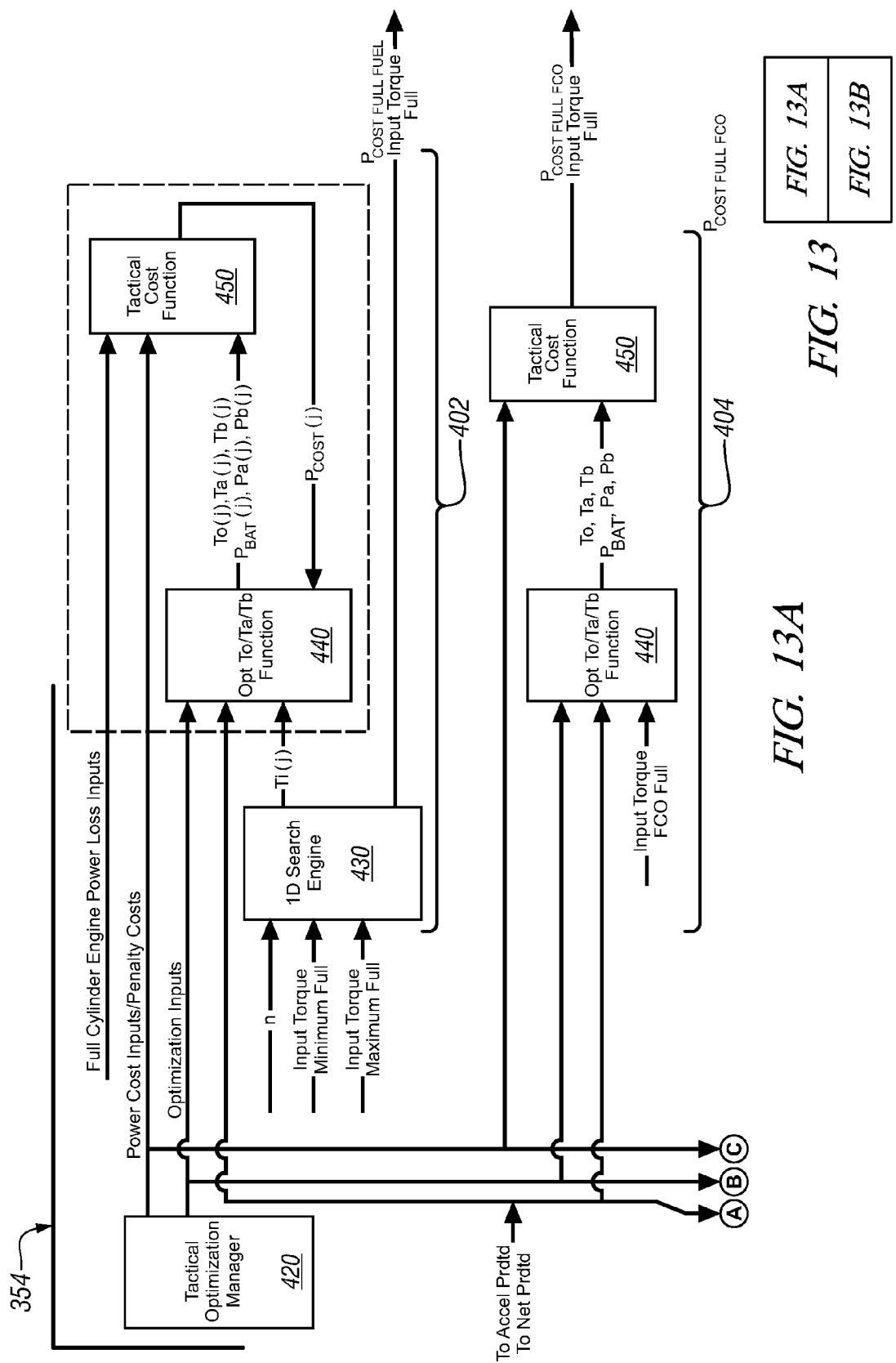

METHOD FOR ALTITUDE-COMPENSATED TRANSMISSION SHIFT SCHEDULING

CROSS REFERENCE TO RELATED APPLICATIONS

This application claims the benefit of U.S. Provisional Application No. 60/984,884, filed on Nov. 2, 2007 which is hereby incorporated herein by reference.

TECHNICAL FIELD

This disclosure pertains to control systems for hybrid powertrain systems.

BACKGROUND

The statements in this section merely provide background information related to the present disclosure and may not constitute prior art.

Known hybrid powertrain architectures can include multiple torque-generative devices, including internal combustion engines and non-combustion torque machines, e.g., electric machines, which transmit torque through a transmission device to an output member. One exemplary hybrid powertrain includes a two-mode, compound-split, electromechanical transmission which utilizes an input member for receiving tractive torque from a prime mover power source, preferably an internal combustion engine, and an output member. The output member can be operatively connected to a driveline for a motor vehicle for transmitting tractive torque thereto. Machines, operative as motors or generators, can generate torque inputs to the transmission independently of a torque input from the internal combustion engine. The Machines may transform vehicle kinetic energy transmitted through the vehicle driveline to energy that is storable in an energy storage device. A control system monitors various inputs from the vehicle and the operator and provides operational control of the hybrid powertrain, including controlling transmission operating state and gear shifting, controlling the torque-generative devices, and regulating the power interchange among the energy storage device and the machines to manage outputs of the transmission, including torque and rotational speed.

SUMMARY

A powertrain system includes an engine coupled to a transmission operative in one of a plurality of operating range states to transfer power between the engine and an output member. A method for controlling the powertrain system includes monitoring an operator torque request, monitoring barometric pressure and engine input speed to the transmission, determining an achievable range of input power transferable from the engine to the transmission based upon the barometric pressure and the engine input speed, and determining a preferred operating range state for the transmission and a preferred engine operating point at the preferred operating range state based upon the operator torque request and the achievable range of input power.

BRIEF DESCRIPTION OF THE DRAWINGS

One or more embodiments will now be described, by way of example, with reference to the accompanying drawings, in which.

DETAILED DESCRIPTION

Figure 1:
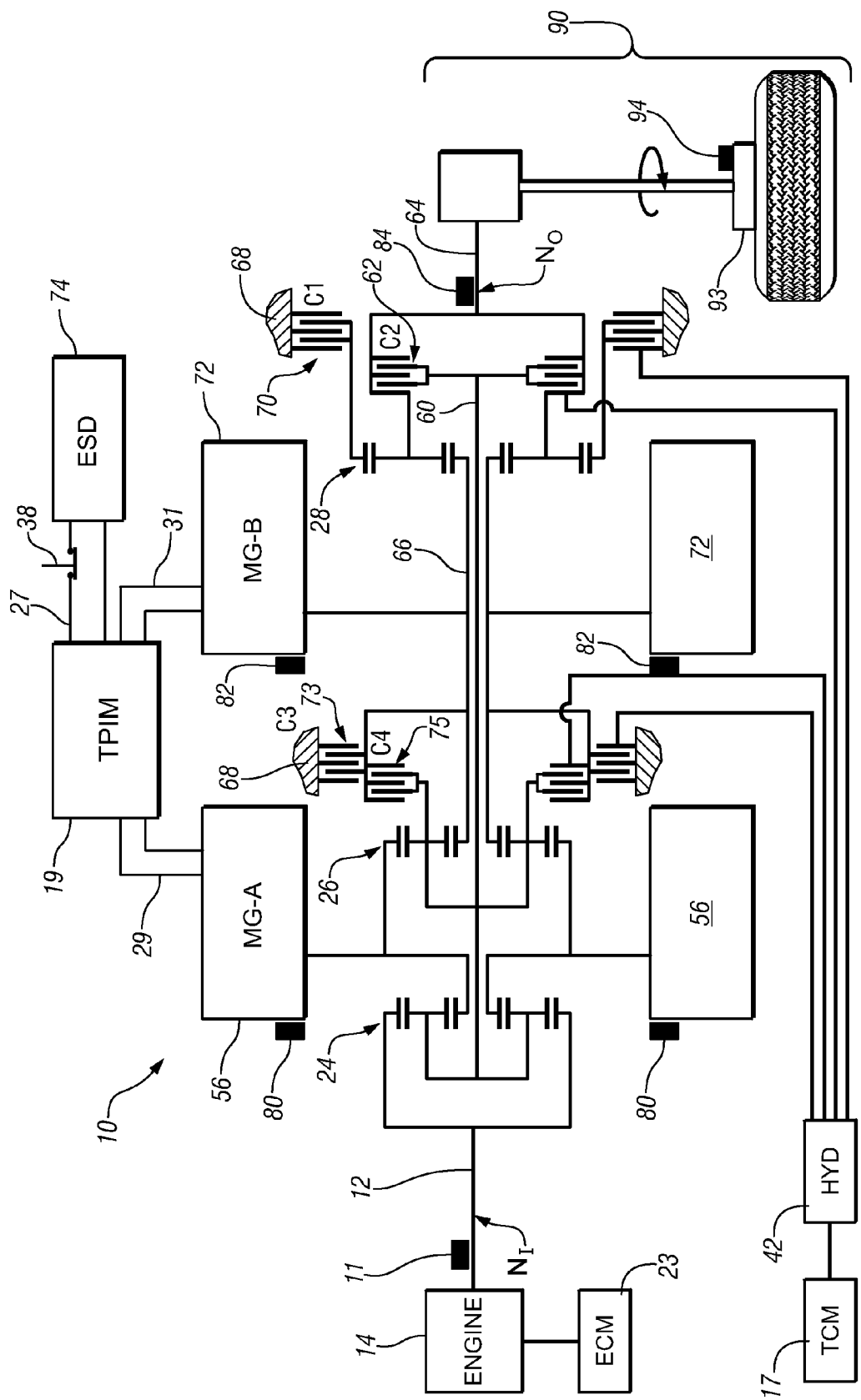
FIG. 1 is a schematic diagram of an exemplary hybrid powertrain, in accordance with the present disclosure.
Figure 2:
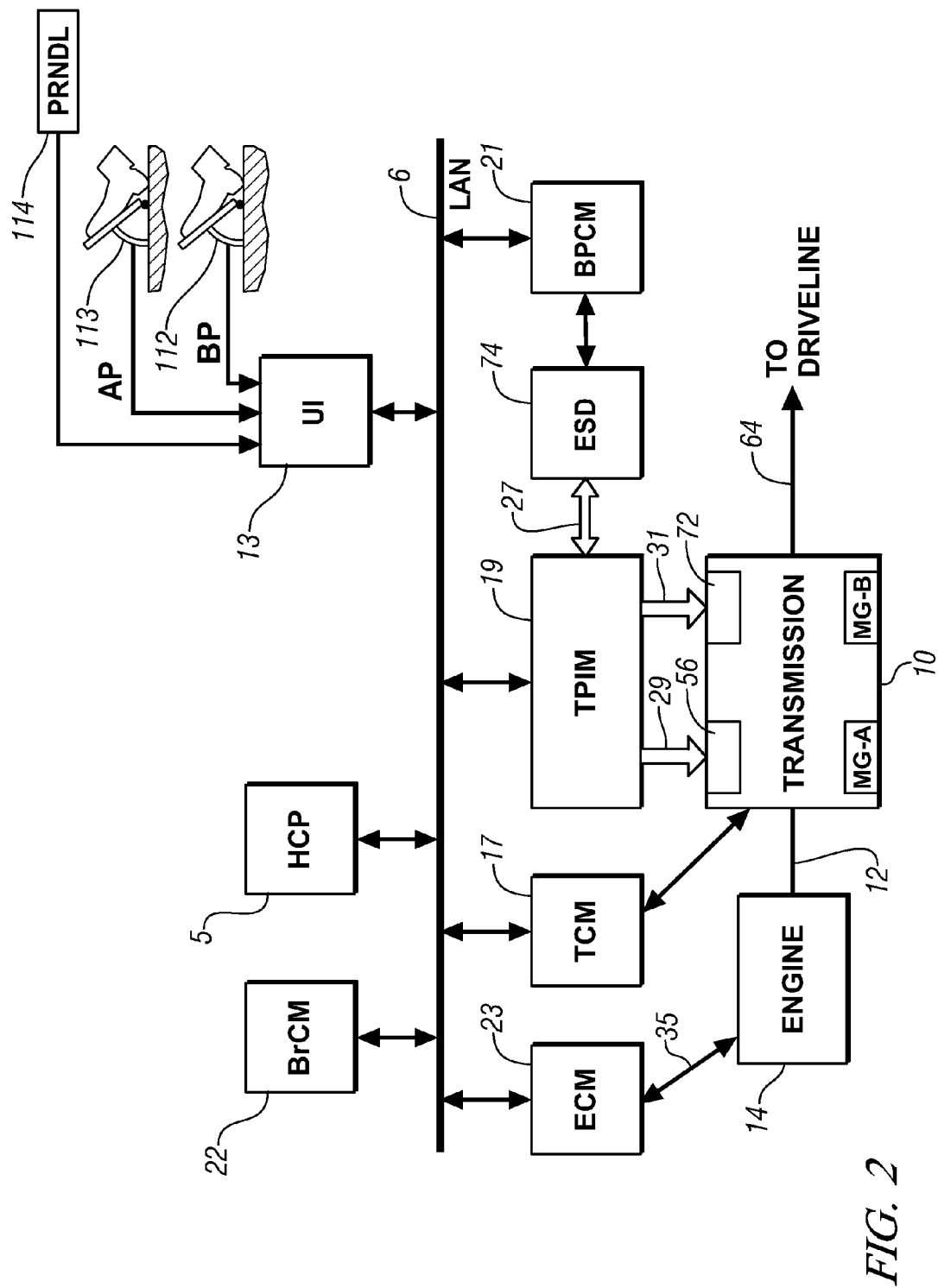
FIG. 2 is a schematic diagram of an exemplary architecture for a control system and hybrid powertrain, in accordance with the present disclosure.

Referring now to the drawings, wherein the showings are for the purpose of illustrating certain exemplary embodiments only and not for the purpose of limiting the same, FIGS. 1 and 2 depict an exemplary hybrid powertrain system. The exemplary hybrid powertrain system in accordance with the present disclosure is depicted in FIG. 1, comprising a two-mode, compound-split, electromechanical hybrid transmission 10 operatively connected to an engine 14 and torque generating machines comprising first and second electric machines ('MG-A') 56 and ('MG-B') 72. The engine 14 and first and second electric machines 56 and 72 each generate mechanical power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and engine torque, can differ from the input speed $N_I$ and the input torque $T_I$ to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a friction brake 94 and a sensor (not shown) adapted to monitor wheel speed, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31 to meet the torque commands for the first and second electric machines 56 and 72 in response to the motor torque commands $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the motor torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electromechanical hybrid powertrain system. The devices include an accelerator pedal 113 ('AP'), an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torque commands $T_A$ and $T_B$ for the first and second electric machines 56 and 72.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes 94 on each of the vehicle wheels 93. The BrCM 22 monitors the operator input to the brake pedal 112 and generates control signals to control the friction brakes 94 and sends a control signal to the HCP 5 to operate the first and second electric machines 56 and 72 based thereon.

Each of the control modules ECM 23, TCM 17, TPIM 19, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several states that can be described in terms of engine states comprising one of an engine-on state ('ON') and an engine-off state ('OFF'), and transmission operating range states comprising a plurality of fixed gears and continuously variable operating modes, described with reference to Table 1, below.

TABLE 1

| Description | Engine State | Transmission Operating Range State | Applied Clutches | |
| --- | --- | --- | --- | --- |
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine torque commands to control the torque generative devices comprising the engine 14 and the first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, a commanded output torque from the transmission 10 to the driveline 90, the input torque from the engine 14, clutch torques for the torque-transfer clutches C1 70, C2 62, C3 73, C4 75 of the transmission 10; and the motor torques for the first and second electric machines 56 and 72, respectively, as is described hereinbelow.

Final vehicle acceleration can be affected by other factors including, e.g., road load, road grade, and vehicle mass. The engine state and the transmission operating range state are determined based upon operating characteristics of the hybrid powertrain. This includes the operator torque request communicated through the accelerator pedal 113 and brake pedal 112 to the user interface 13 as previously described. The transmission operating range state and the engine state may be predicated on a hybrid powertrain torque demand caused by a command to operate the first and second electric machines 56 and 72 in an electrical energy generating mode or in a torque generating mode. The transmission operating range state and the engine state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 at output member 64 that is required to meet the operator torque request while meeting other powertrain operating demands, e.g., charging the ESD 74. As should be apparent from the description above, the ESD 74 and the first and second electric machines 56 and 72 are electrically-operatively coupled for power flow therebetween. Furthermore, the engine 14, the first and second electric machines 56 and 72, and the electromechanical transmission 10 are mechanically-operatively coupled to transfer power therebetween to generate a power flow to the output member 64.

Figure 3:
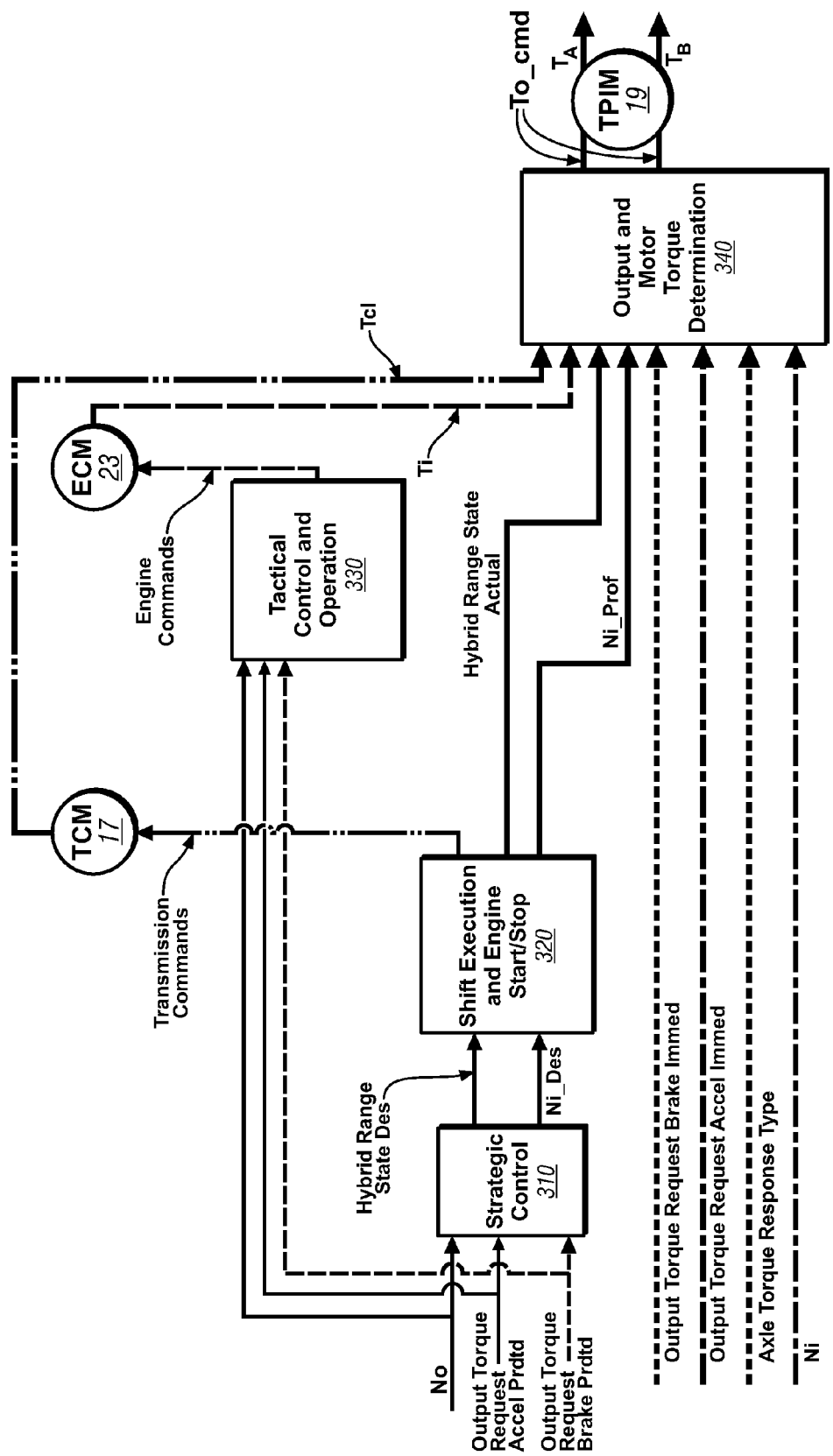
FIGS. 3-8 are schematic flow diagrams of a control scheme, in accordance with the present disclosure.

FIG. 3 shows a control system architecture for controlling and managing signal flow in a hybrid powertrain system having multiple torque generative devices, described hereinbelow with reference to the hybrid powertrain system of FIGS. 1 and 2, and residing in the aforementioned control modules in the form of executable algorithms and calibrations. The control system architecture is applicable to alternative hybrid powertrain systems having multiple torque generative devices, including, e.g., a hybrid powertrain system having an engine and a single electric machine, a hybrid powertrain system having an engine and multiple electric machines. Alternatively, the hybrid powertrain system can utilize non-electric torque-generative machines and energy storage systems, e.g., hydraulic-mechanical hybrid transmissions (not shown).

In operation, the operator inputs to the accelerator pedal 113 and the brake pedal 112 are monitored to determine the operator torque request. The operator inputs to the accelerator pedal 113 and the brake pedal 112 comprise individually determinable operator torque request inputs including an immediate accelerator output torque request ('Output Torque Request Accel Immed'), a predicted accelerator output torque request ('Output Torque Request Accel Prdtd'), an immediate brake output torque request ('Output Torque Request Brake Immed'), a predicted brake output torque request ('Output Torque Request Brake Prdtd') and an axle torque response type ('Axle Torque Response Type'). As used herein, the term 'accelerator' refers to an operator request for forward propulsion preferably resulting in increasing vehicle speed over the present vehicle speed, when the operator selected position of the transmission gear selector 114 commands operation of the vehicle in the forward direction. The terms 'deceleration' and 'brake' refer to an operator request preferably resulting in decreasing vehicle speed from the present vehicle speed. The immediate accelerator output torque request, the predicted accelerator output torque request, the immediate brake output torque request, the predicted brake output torque request, and the axle torque response type are individual inputs to the control system. Additionally, operation of the engine 14 and the transmission 10 are monitored to determine the input speed ('Ni') and the output speed ('No').

The immediate accelerator output torque request comprises an immediate torque request determined based upon the operator input to the accelerator pedal 113. The control system controls the output torque from the hybrid powertrain system in response to the immediate accelerator output torque request to cause positive acceleration of the vehicle. The immediate brake output torque request comprises an immediate braking request determined based upon the operator input to the brake pedal 112. The control system controls the output torque from the hybrid powertrain system in response to the immediate brake output torque request to cause deceleration, or negative acceleration, of the vehicle. Vehicle deceleration effected by control of the output torque from the hybrid powertrain system is combined with vehicle deceleration effected by a vehicle braking system (not shown) to decelerate the vehicle to achieve the immediate braking request.

The immediate accelerator output torque request is determined based upon a presently occurring operator input to the accelerator pedal 113, and comprises a request to generate an immediate output torque at the output member 64 preferably to accelerate the vehicle. The immediate accelerator output torque request is unshaped, but can be shaped by events that affect vehicle operation outside the powertrain control. Such events include vehicle level interruptions in the powertrain control for antilock braking, traction control and vehicle stability control, which can be used to unshape or rate-limit the immediate accelerator output torque request.

The predicted accelerator output torque request is determined based upon the operator input to the accelerator pedal 113 and comprises an optimum or preferred output torque at the output member 64. The predicted accelerator output torque request is preferably equal to the immediate accelerator output torque request during normal operating conditions, e.g., when any one of antilock braking, traction control, or vehicle stability is not being commanded. When any one of antilock braking, traction control or vehicle stability is being commanded the predicted accelerator output torque request remains the preferred output torque with the immediate accelerator output torque request being decreased in response to output torque commands related to the antilock braking, traction control, or vehicle stability control.

The immediate brake output torque request is determined based upon the operator input to the brake pedal 112 and the control signal to control the friction brakes 94 to generate friction braking torque.

The predicted brake output torque request comprises an optimum or preferred brake output torque at the output member 64 in response to an operator input to the brake pedal 112 subject to a maximum brake output torque generated at the output member 64 allowable regardless of the operator input to the brake pedal 112. In one embodiment the maximum brake output torque generated at the output member 64 is limited to −0.2 g. The predicted brake output torque request can be phased out to zero when vehicle speed approaches zero regardless of the operator input to the brake pedal 112. As desired by a user, there can be operating conditions under which the predicted brake output torque request is set to zero, e.g., when the operator setting to the transmission gear selector 114 is set to a reverse gear, and when a transfer case (not shown) is set to a four-wheel drive low range. The operating conditions whereat the predicted brake output torque request is set to zero are those in which blended braking is not preferred due to vehicle operating factors.

The axle torque response type comprises an input state for shaping and rate-limiting the output torque response through the first and second electric machines 56 and 72. The input state for the axle torque response type can be an active state, preferably comprising one of a pleasability limited state a maximum range state, and an inactive state. When the commanded axle torque response type is the active state, the output torque command is the immediate output torque. Preferably the torque response for this response type is as fast as possible.

Blended braking includes generating friction braking torque at the wheels 93 and generating output torque at the output member 64 to react with the driveline 90 to decelerate the vehicle in response to the operator input to the brake pedal 112. The BrCM 22 commands the friction brakes 94 to apply braking torque and generates a command for the transmission 10 to create a negative output torque which reacts with the driveline 90 in response to the immediate braking request. Preferably the applied braking torque and the negative output torque can decelerate and stop the vehicle so long as they are sufficient to overcome vehicle kinetic power at wheel(s) 93. The negative output torque reacts with the driveline 90, thus transferring torque to the electromechanical transmission 10 and the engine 14. The negative output torque reacted through the electromechanical transmission 10 can be transferred to one or both of the first and second electric machines 56 and 72 to generate electric power for storage in the ESD 74.

A strategic optimization control scheme ('Strategic Control') 310 determines a preferred input speed ('Ni_Des') and a preferred engine state and transmission operating range state ('Hybrid Range State Des') based upon the output speed and the operator torque request and based upon other operating parameters of the hybrid powertrain, including battery power limits and response limits of the engine 14, the transmission 10, and the first and second electric machines 56 and 72. The predicted accelerator output torque request and the predicted brake output torque request are input to the strategic optimization control scheme 310. The strategic optimization control scheme 310 is preferably executed by the HCP 5 during each 100 ms loop cycle and each 25 ms loop cycle. The desired operating range state for the transmission 10 and the desired input speed from the engine 14 to the transmission 10 are inputs to the shift execution and engine start/stop control scheme 320.

The shift execution and engine start/stop control scheme 320 commands changes in the transmission operation ('Transmission Commands') including changing the operating range state based upon the inputs and operation of the powertrain system. This includes commanding execution of a change in the transmission operating range state if the preferred operating range state is different from the present operating range state by commanding changes in application of one or more of the clutches C1 70, C2 62, C3 73, and C4 75 and other transmission commands. The present operating range state ('Hybrid Range State Actual') and an input speed profile ('Ni_Prof') can be determined. The input speed profile is an estimate of an upcoming input speed and preferably comprises a scalar parametric value that is a targeted input speed for the forthcoming loop cycle. The engine operating commands and the operator torque request are based upon the input speed profile during a transition in the operating range state of the transmission.

A tactical control scheme ('Tactical Control and Operation') 330 is repeatedly executed during one of the control loop cycles to determine engine commands ('Engine Commands') for operating the engine 14, including a preferred input torque from the engine 14 to the transmission 10 based upon the output speed, the input speed, and the operator torque request comprising the immediate accelerator output torque request, the predicted accelerator output torque request, the immediate brake output torque request, the predicted brake output torque request, the axle torque response type, and the present operating range state for the transmission. The engine commands also include engine states including one of an all-cylinder operating state and a cylinder deactivation operating state wherein a portion of the engine cylinders are deactivated and unfueled, and engine states including one of a fueled state and a fuel cutoff state. An engine command comprising the preferred input torque of the engine 14 and a present input torque ('Ti') reacting between the engine 14 and the input member 12 are preferably determined in the ECM 23. Clutch torques ('Tcl') for each of the clutches C1 70, C2 62, C3 73, and C4 75, including the presently applied clutches and the non-applied clutches are estimated, preferably in the TCM 17.

An output and motor torque determination scheme ('Output and Motor Torque Determination') 340 is executed to determine the preferred output torque from the powertrain ('To_cmd'). This includes determining motor torque commands ('$T_A$', '$T_B$') to transfer a net commanded output torque to the output member 64 of the transmission 10 that meets the operator torque request, by controlling the first and second electric machines 56 and 72 in this embodiment. The immediate accelerator output torque request, the immediate brake output torque request, the present input torque from the engine 14 and the estimated applied clutch torque(s), the present operating range state of the transmission 10, the input speed, the input speed profile, and the axle torque response type are inputs. The output and motor torque determination scheme 340 executes to determine the motor torque commands during each iteration of one of the loop cycles. The output and motor torque determination scheme 340 includes algorithmic code which is regularly executed during the 6.25 ms and 12.5 ms loop cycles to determine the preferred motor torque commands.

The hybrid powertrain is controlled to transfer the output torque to the output member 64 to react with the driveline 90 to generate tractive torque at wheel(s) 93 to forwardly propel the vehicle in response to the operator input to the accelerator pedal 113 when the operator selected position of the transmission gear selector 114 commands operation of the vehicle in the forward direction. Similarly, the hybrid powertrain is controlled to transfer the output torque to the output member 64 to react with the driveline 90 to generate tractive torque at wheel(s) 93 to propel the vehicle in a reverse direction in response to the operator input to the accelerator pedal 113 when the operator selected position of the transmission gear selector 114 commands operation of the vehicle in the reverse direction. Preferably, propelling the vehicle results in vehicle acceleration so long as the output torque is sufficient to overcome external loads on the vehicle, e.g., due to road grade, aerodynamic loads, and other loads.

Figure 4:
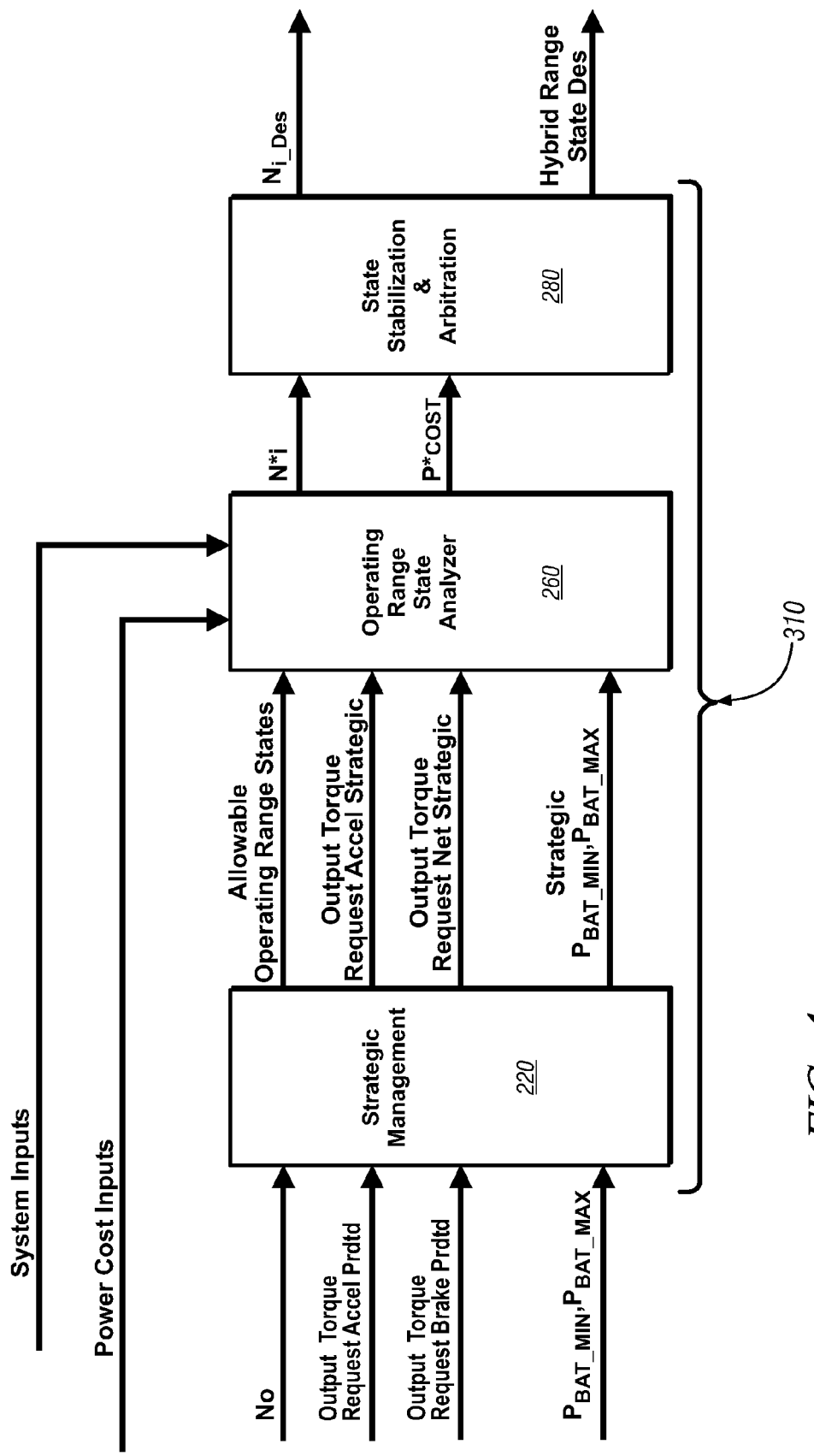

FIG. 4 details signal flow in the strategic optimization control scheme 310, which includes a strategic manager ('Strategic Manager') 220, an operating range state analyzer 260, and a state stabilization and arbitration block 280 to determine the preferred input speed ('Ni_Des') and the preferred transmission operating range state ('Hybrid Range State Des'). The strategic manager ('Strategic Manager') 220 monitors the output speed No, the predicted accelerator output torque request ('Output Torque Request Accel Prdtd'), the predicted brake output torque request ('Output Torque Request Brake Prdtd'), and available battery power $P_{BAT\_MIN}$ to $P_{BAT\_MAX}$. The strategic manager 220 determines which of the transmission operating range states are allowable, and determines output torque requests comprising a strategic accelerator output torque request ('Output Torque Request Accel Strategic') and a strategic net output torque request ('Output Torque Request Net Strategic'), all of which are input the operating range state analyzer 260 along with penalty costs ('Penalty Costs'), system inputs ('System Inputs') and power cost inputs ('Power Cost Inputs'). The operating range state analyzer 260 generates a preferred power cost ('P*cost') and associated input speed ('N*i') for each of the allowable operating range states based upon the operator torque requests, the system inputs, the available battery power and the power cost inputs. The preferred power costs and associated input speeds for the allowable operating range states are input to the state stabilization and arbitration block 280 which selects the preferred operating range state and preferred input speed based thereon.

Figure 5:
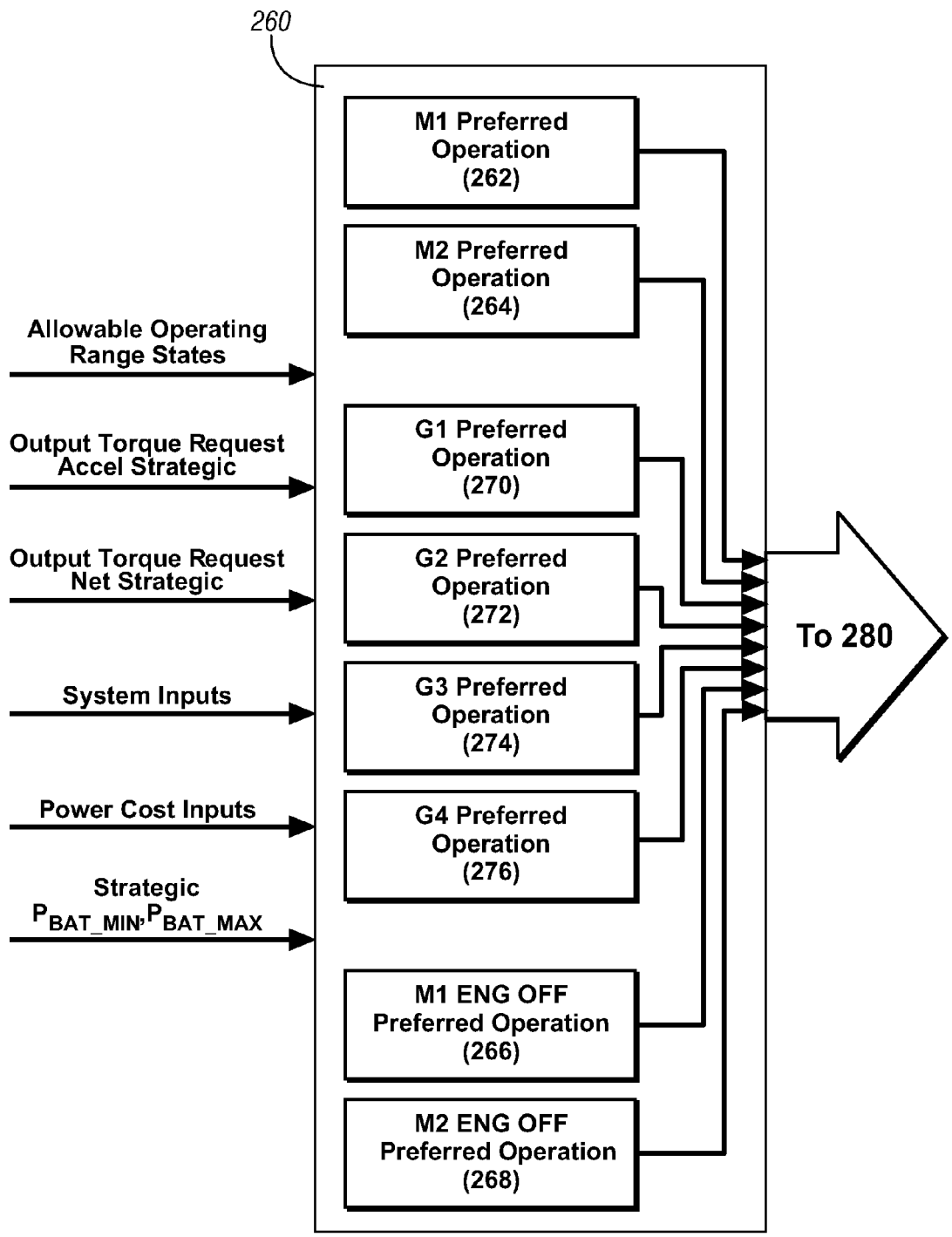

FIG. 5 show the operating range state analyzer 260 which executes searches in each candidate operating range state comprising the allowable ones of the operating range states, including M1 (262), M2 (264), G1 (270), G2 (272), G3 (274), and G4 (276) to determine preferred operation of the torque actuators, i.e., the engine 14 and the first and second electric machines 56 and 72 in this embodiment. The preferred operation preferably comprises a minimum power cost for operating the hybrid powertrain system and an associated engine input for operating in the candidate operating range state in response to the operator torque request. The associated engine input comprises at least one of a preferred engine input speed ('Ni*'), a preferred engine input power ('Pi*'), and a preferred engine input torque ('Ti*') that is responsive to and preferably meets the operator torque request. The operating range state analyzer 260 evaluates M1-Engine Off (264) and M2-Engine Off (266) to determine a preferred cost ('P*cost') for operating the powertrain system responsive to and preferably meeting the operator torque request when the engine 14 is in the engine-off state.

Figure 6:
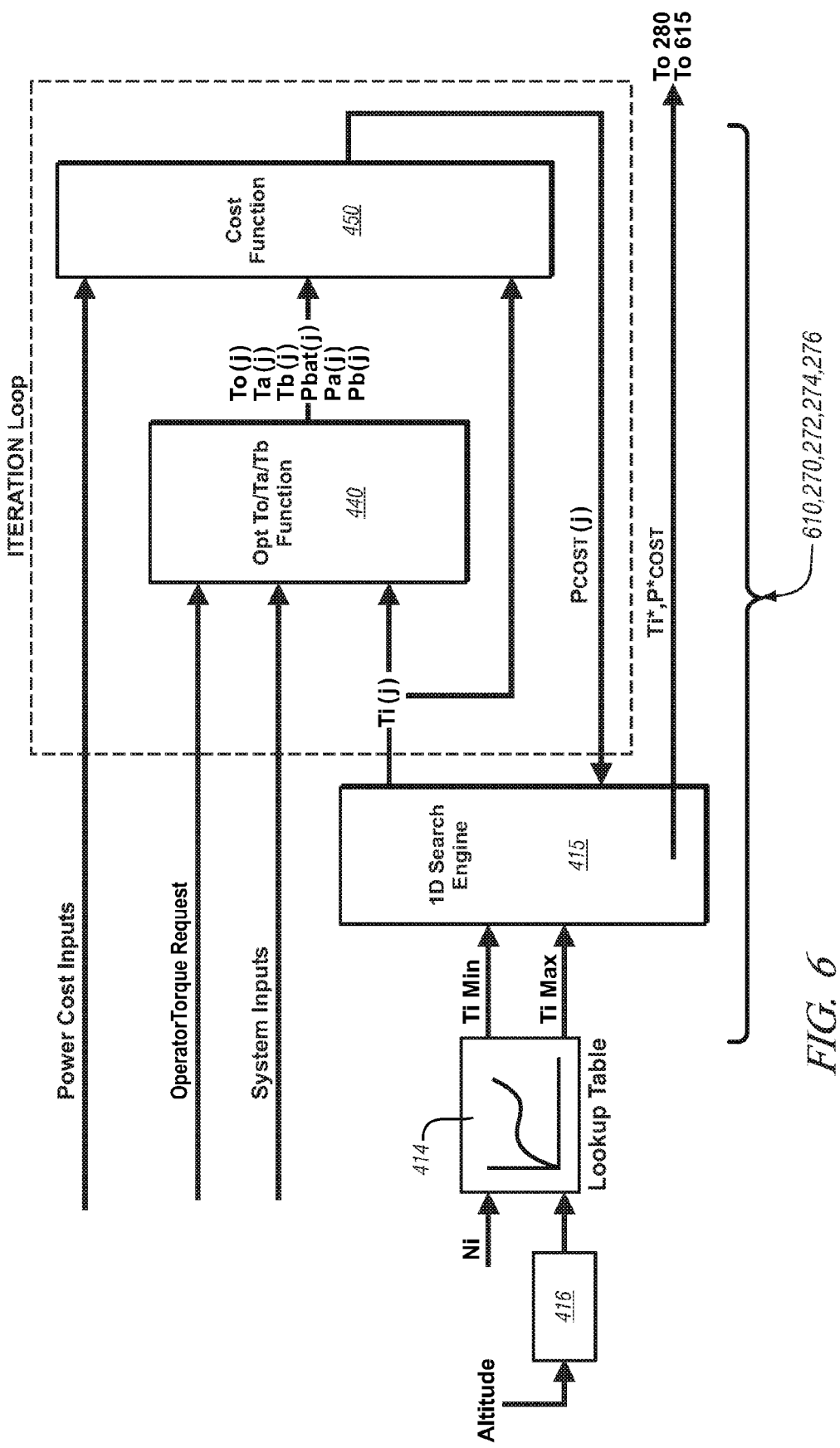

The preferred operation in each of G1 (270), G2 (272), G3 (274), and G4 (276) can be determined by executing a 1-dimensional search scheme 610, shown schematically in FIG. 6. The 1-dimension search scheme 610 is preferably executed for each of G1 (270), G2 (272), G3 (274), and G4 (276) to determine the preferred operation. A range of one controllable input, in this embodiment comprising minimum and maximum achievable input torques ('Ti Min', 'TiMax'), is input to a 1-D search engine 415. The minimum and maximum achievable input torques from the engine 14 to the transmission 10 ('Ti Min/Max') vary with input speed, barometric pressure or altitude, and other factors associated with the powertrain system.

Figure 10:
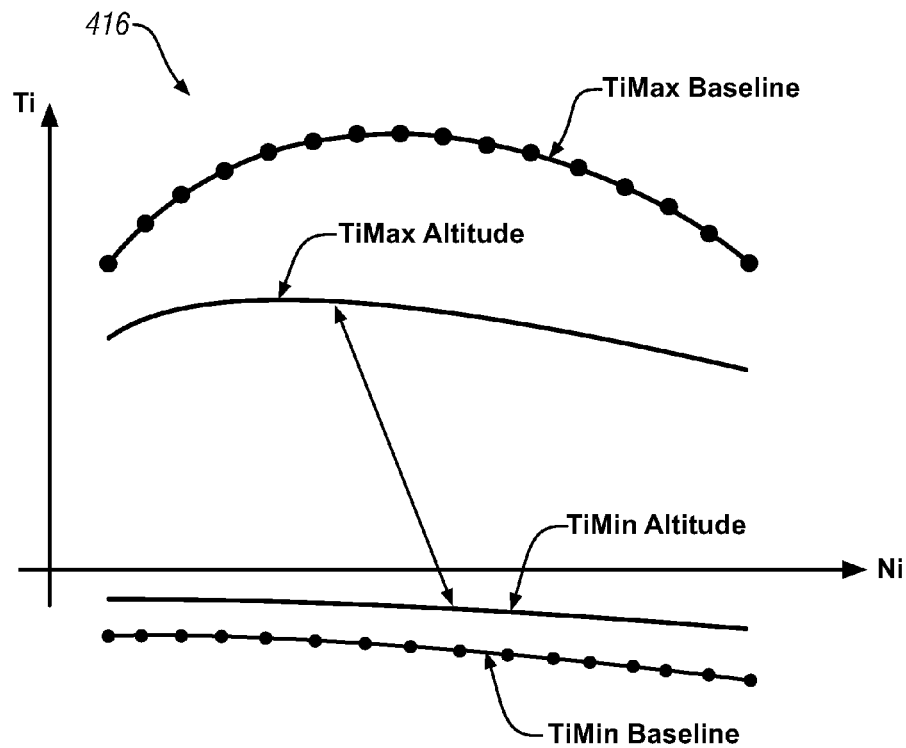
FIGS. 10 and 11 are datagraphs, in accordance with the present disclosure.

FIG. 10 shows exemplary input speed-based calibrations 416 of maximum and minimum achievable input torques for an engine 14 illustrating the variation. Baseline maximum and minimum input torques ('Ti Max Baseline', 'Ti Min Baseline') are shown and vary as a function of the input speed Ni. Maximum and minimum input torques are shown at an altitude ('Ti Max Altitude', 'Ti Min Altitude'), indicating that maximum achievable engine power and thus maximum achievable input torque from the engine 14 to the transmission 10 reduces as the powertrain operates at increased altitudes, due to lower barometric pressure and reduced oxygen in the intake air. Similarly minimum achievable engine power and thus minimum achievable engine torque input to the transmission 10 increases as the powertrain operates at increased altitudes. The engine power output and thus engine input torque to the transmission 10 also varies over the range of input speeds Ni. The ECM 23 is operative to measure or otherwise determine altitude ('Altitude') using an on-board barometric sensor (not shown) or another sensing method. In one embodiment the calibration depicted in FIG. 10 comprises the baseline maximum and minimum input torques determined for a range of engine speeds on an engine at sea level or barometric pressure of 100 kPa, and the altitude maximum and minimum input torques determined for the range of engine speeds on the engine at a barometric pressure of 70 kPa, with the maximum and minimum achievable input torques determined at other barometric pressures using interpolation techniques. Thus, the input speed Ni can be determined in fixed gear operating range state for the transmission output speed No that comprises the input to the strategic control scheme 310 based upon the gear ratio. The range of achievable input torques to the search engine ('Ti Min', 'Ti Max') can be determined based upon input-speed based calibrations 416 of maximum and minimum input torques and the input speed Ni (414) that are determined based upon the altitude ('Altitude') of the powertrain system.

The 1-D search engine 415 iteratively generates candidate input torques ('Ti(j)') which range between the achievable minimum and maximum input torques, each which is input to an optimization function ('Opt To/Ta/Tb') 440, for n search iterations. Other inputs to the optimization function 440 include system inputs preferably comprise parametric states for battery power, clutch torques, electric motor operation, transmission and engine operation, and the specific operating range state. The optimization function 440 determines transmission operation comprising an output torque, motor torques, and associated battery and electrical powers ('To(j), Ta(j), Tb(j), Pbat(j), Pa(j), Pb(j)') associated with the candidate input torque based upon the system inputs in response to the operator torque request for the candidate operating range state. The output torque, motor torques, and associated battery powers, penalty costs, and power cost inputs are input to a cost function 450, which executes to determine a power cost ('Pcost(j)') for operating the powertrain in the candidate operating range state at the candidate input torque in response to the operator torque request. The 1-D search engine 415 iteratively generates candidate input torques over the range of achievable input torques. The candidate input torques are inputted to the optimization function 440 and the cost function 450 to determine the power costs associated therewith to identify a preferred input torque ('Ti*') and associated preferred cost ('P*cost'). The preferred input torque ('Ti*') comprises the candidate input torque within the range of achievable input torques that results in a minimum power cost of the candidate operating range state, i.e., the preferred cost.

Figure 7:
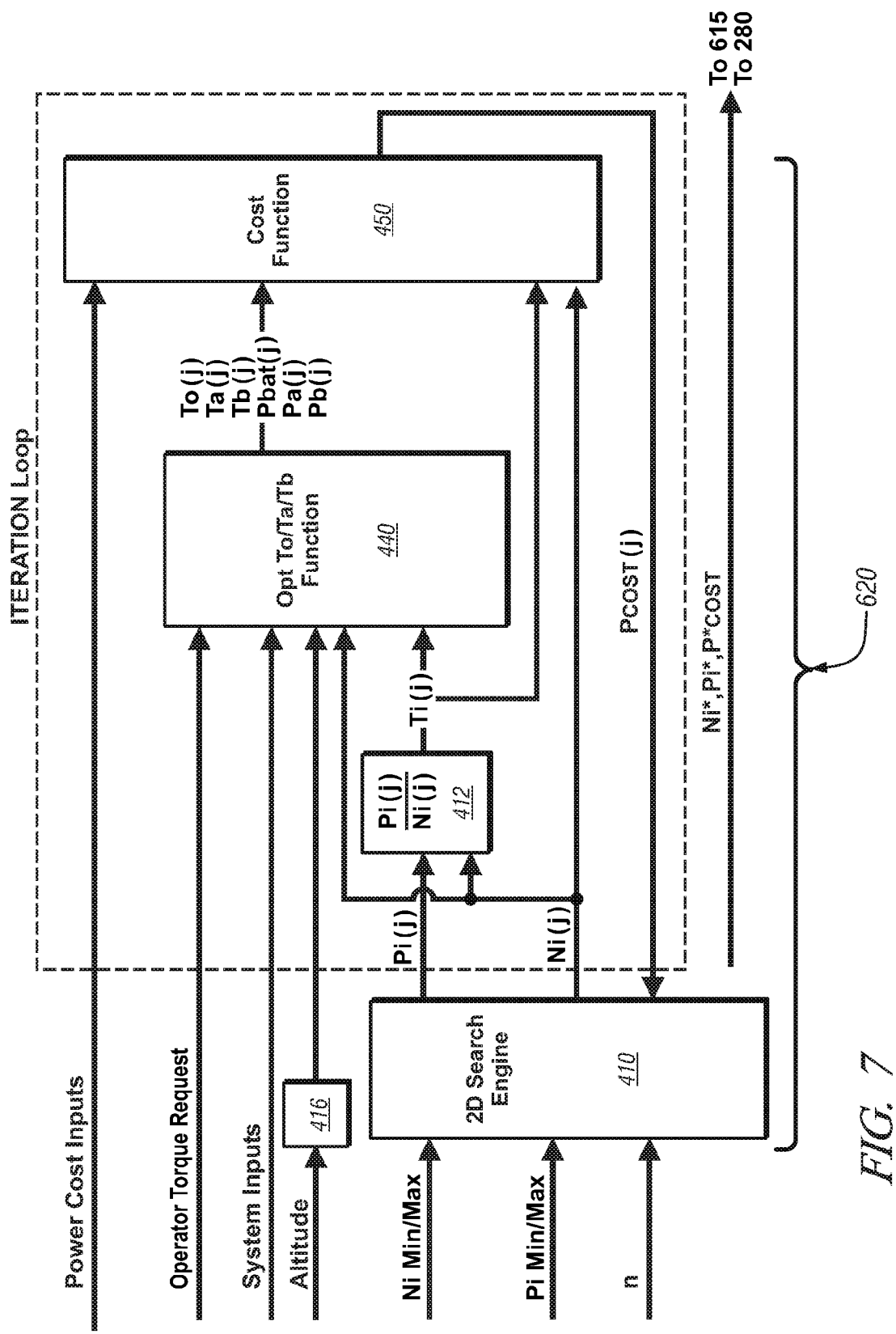
Figure 8:
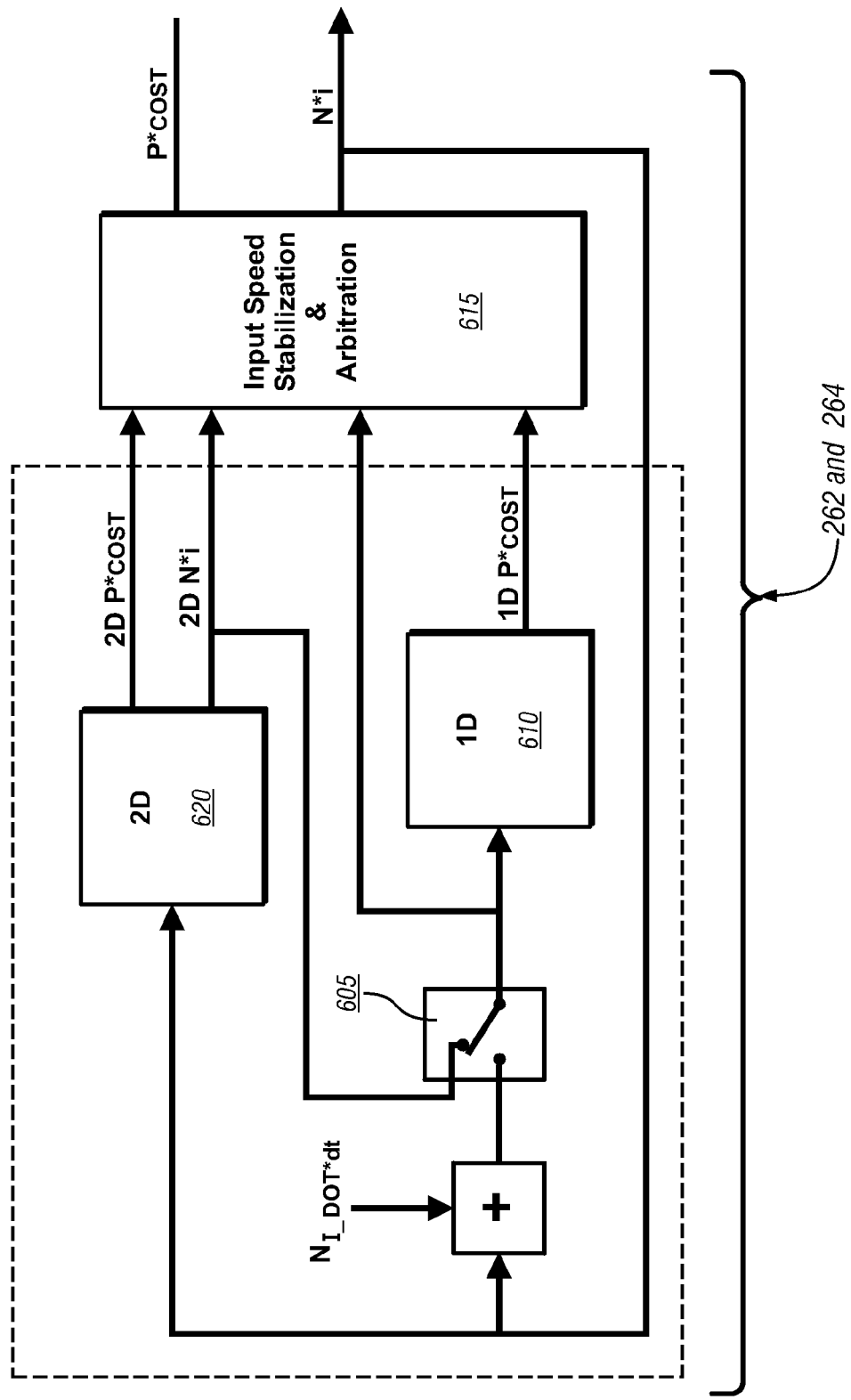

The preferred operation in each of M1 and M2 can be determined by executing a 2-dimensional search scheme 620, shown with reference to FIGS. 7 and 8, in conjunction with executing a 1-dimensional search using the 1-dimensional search scheme 610 based upon a previously determined input speed which can be arbitrated ('State Stabilization and Arbitration') 615 to determine preferred input speeds ('Ni*') and associated preferred costs ('P*cost') for the operating range states.

FIG. 7 schematically shows signal flow for the 2-dimension search scheme 620. Ranges of two controllable inputs, in this embodiment comprising minimum and maximum input speeds ('Ni Min/Max') and minimum and maximum input powers ('Pi Min/Max') are input to a 2-D search engine 410. The 2-D search engine 410 iteratively generates candidate input speeds ('Ni(j)') and candidate input powers ('Pi(j)') which range between the minimum and maximum input speeds and powers. The candidate input power is preferably converted to a candidate input torque ('Ti(j)') (412). The ECM 23 is operative to measure or otherwise determine altitude ('Altitude') which is input to the input speed-based calibrations 416 to determine the maximum and minimum achievable input torques based upon altitude. Each candidate input speed ('Ni(j)') is input to a pre-optimization function (not shown), which generates the maximum and minimum achievable input torques corresponding to the input speed Ni(j) and determined based upon the input speed-based calibrations 416. Inputs to the pre-optimization function 418 include a range of motor torques ('Ta Min/Max(j)', ('Tb Min/Max(j)') and applied clutch torques ('Tcn Min/Max(j)') for the candidate operating point. The candidate input torque ('Ti(j)') is limited by the maximum and minimum achievable input torques corresponding to the candidate input speed Ni(j).

The optimization function 440 determines transmission operation comprising an output torque, motor torques, and associated battery and electrical powers ('To(j), Ta(j), Tb(j), Pbat(j), Pa(j), Pb(j)') associated with the candidate input torque ('Ti(j)') and candidate input speed Ni(j), and based upon the system inputs and the operating torque request for the candidate operating range state. The output torque, motor torques, and associated battery powers and power cost inputs are input to a cost function 450, which executes to determine a power cost ('Pcost(j)') for operating the powertrain at the candidate input power and candidate input speed in response to the operator torque request in the candidate operating range state. The 2-D search engine 410 iteratively generates the candidate input speeds and candidate input powers over the range of input speeds and range of input powers and determines the power costs associated therewith to identify a preferred input power ('P*') and preferred input speed ('Ni*') and associated preferred cost ('P*cost'). The preferred input power ('P*') and preferred input speed ('N*') comprises the candidate input power and candidate input speed that result in a minimum power cost for the candidate operating range state.

Figure 9:
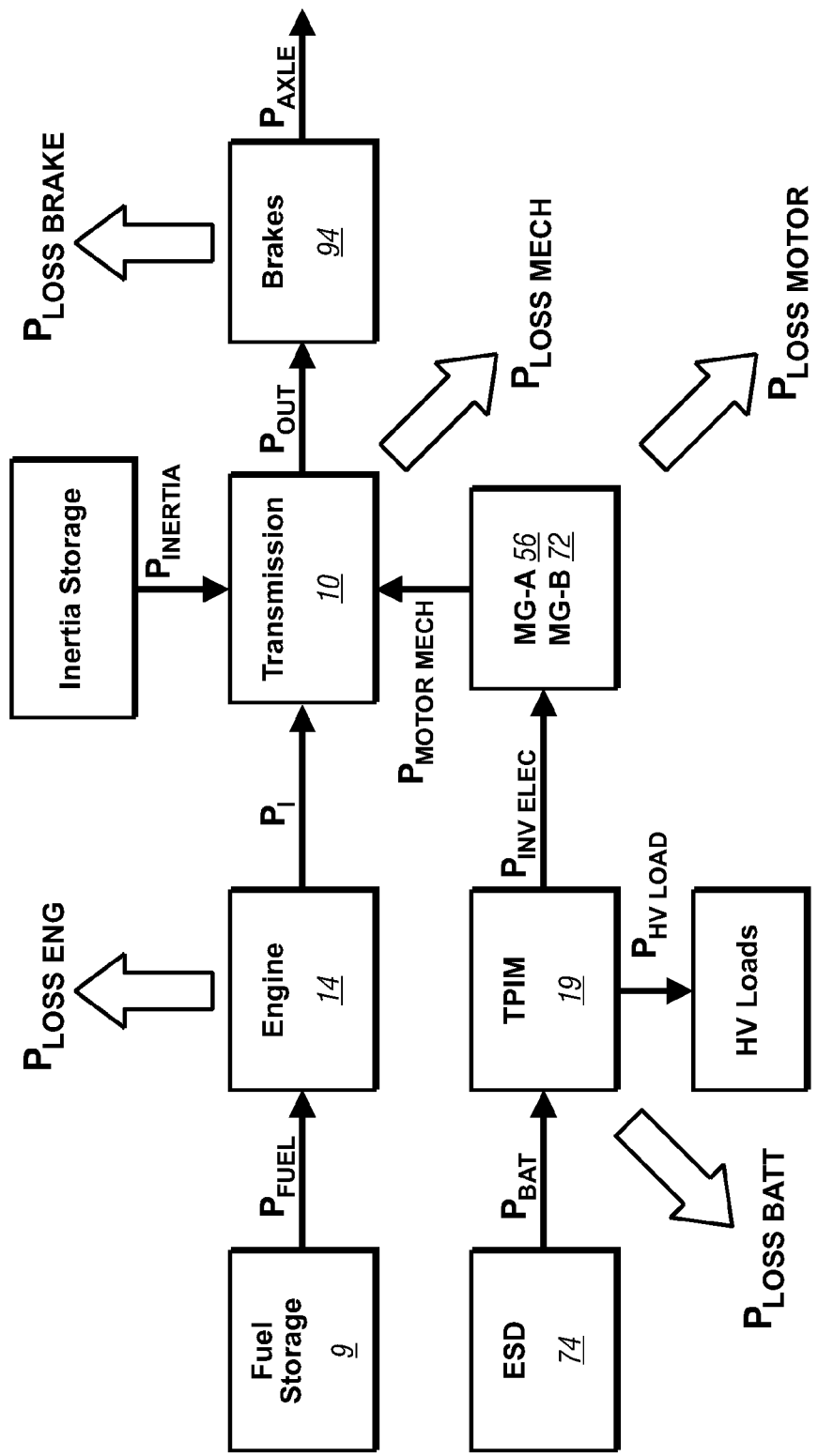
FIG. 9 is a schematic power flow diagram, in accordance with the present disclosure.

FIG. 9 schematically shows power flow and power losses through hybrid powertrain system, in context of the exemplary powertrain system described above. There is a first power flow path from a fuel storage system 9 which transfers fuel power ('$P_{FUEL}$') to the engine 14 which transfers input power ('$P_I$') to the transmission 10. The power loss in the first flow path comprises engine power losses ('$P_{LOSS\ ENG}$'). There is a second power flow path which transfers electric power ('$P_{BATT}$') from the ESD 74 to the TPIM 19 which transfers electric power ('$P_{IN\ ELEC}$') to the first and second electric machines 56 and 72 which transfer motor mechanical power ('$P_{MOTOR\ MECH}$') to the transmission 10. The power losses in the second power flow path include battery power losses ('$P_{LOSS\ BATT}$') and electric motor power losses ('$P_{LOSS\ MOTOR}$'). The TPIM 19 has an electric power load ('$P_{HV\ LOAD}$') that services electric loads in the system ('HV Loads'), which can include a low voltage battery storage system (not shown). The transmission 10 has a mechanical inertia power load input ('$P_{INERTIA}$') in the system ('Inertia Storage') that preferably include inertias from the engine 14 and the transmission 10. The transmission 10 has a mechanical power losses ('$P_{LOSS\ MECH}$') and power output ('$P_{OUT}$'). A brake system including the friction brakes 94 has brake power losses ('$P_{LOSS\ BRAKE}$'). Remaining system power is transferred to the driveline as axle power ('$P_{AXLE}$').

The power cost inputs to the cost function 450 are determined based upon factors related to vehicle driveability, fuel economy, emissions, and battery usage. Power costs are assigned and associated with fuel and electrical power consumption and are associated with a specific operating points of the hybrid powertrain. Lower operating costs can be associated with lower fuel consumption at high conversion efficiencies, lower battery power usage, and lower emissions for each engine speed/load operating point, and take into account the candidate operating state of the engine 14. As described hereinabove, the power costs may include the engine power losses ('$P_{LOSS\ ENG}$'), electric motor power losses ('$P_{LOSS\ MOTOR}$'), battery power losses ('$P_{LOSS\ BATT}$'), brake power losses ('$P_{LOSS\ BRAKE}$'), and mechanical power losses ('$P_{LOSS\ MECH}$') associated with operating the hybrid powertrain at a specific operating point which includes input speed, motor speeds, input torque, motor torques, a transmission operating range state and an engine state.

The state stabilization and arbitration block 280 selects a preferred transmission operating range state ('Hybrid Range State Des') which preferably is the transmission operating range state associated with the minimum preferred cost for the allowed operating range states output from the operating range state analyzer 260, taking into account factors related to arbitrating effects of changing the operating range state on the operation of the transmission to effect stable powertrain operation. The preferred input speed ('Ni_Des') is the engine input speed associated with the preferred engine input comprising the preferred engine input speed ('Ni*'), the preferred engine input power ('Pi*'), and the preferred engine input torque ('Ti*') that is responsive to and preferably meets the operator torque request for the selected preferred operating range state.

Figure 11:
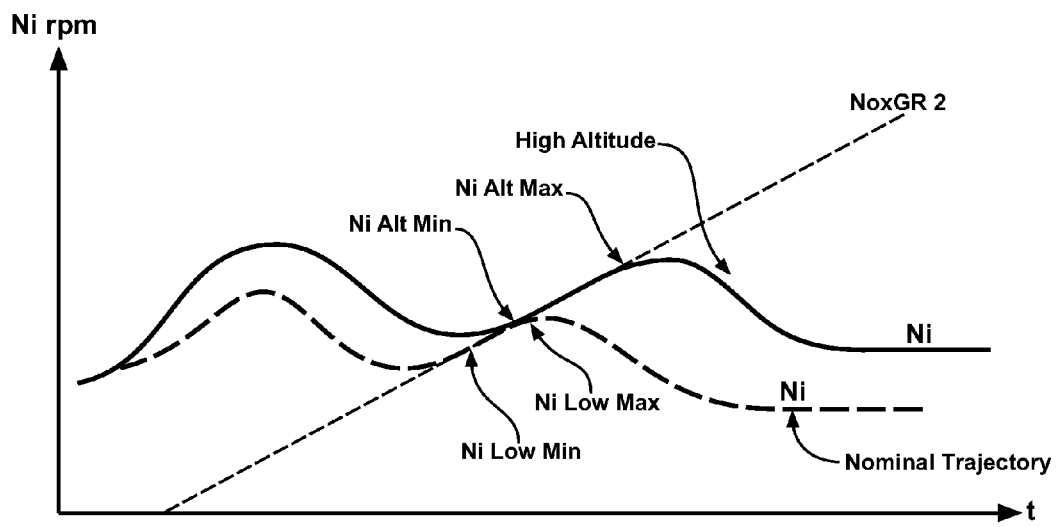

FIG. 11 graphically shows input speed ('Ni rpm') as a function of time ('t') for an exemplary system operating at a low altitude ('Nominal Trajectory') and at a high altitude ('High Altitude'), relative to operation in a fixed gear, in this example G2 ('NoxGR2'). Preferably, the engine 14 acquires data from a sensor (not shown) operative to measure barometric pressure during ongoing operation to determine altitude. When operating at low altitude, the engine 14 can generate sufficient input torque to operate the transmission 10 in the selected fixed gear at lower input speeds than achievable when operating at high altitude at the same engine speed, due to reduced engine torque output at the higher altitude. The reduced engine torque at higher altitude is shown with reference to FIG. 10. As shown, when operating at low altitude the engine 14 can operate between a minimum engine speed ('Ni Low Min') and a maximum engine speed ('Ni Low Max') in the fixed gear. At high altitude, the engine 14 can operate between a minimum engine speed ('Ni Alt Min') and a maximum engine speed ('Ni Alt Max') in the fixed gear, both of which are greater than the corresponding minimum engine speed ('Ni Low Min') and the maximum engine speed ('Ni Low Max') for low altitude. Therefore, during ongoing operation of the powertrain system, the control system can adjust the shift scheduling of the transmission 10, effecting operation in one of the specific fixed gears at lower engine input speeds at low altitudes, and incrementally increasing the engine input speed at which operation in the specific fixed gear is permitted with increasing altitude. This compensation for altitude is executed during each cycle in which the engine input is determined, and affects the determination of the preferred engine input speed ('Ni*') and preferred engine power ('Pi*') within the ranges of inputs previously described. Thus, the preferred transmission operating range state can be adjusted based engine operation as affected by barometric pressure and altitude.

The effect of barometric pressure and altitude affects engine operation, including selection of a preferred engine torque and a preferred engine state. Selection of the preferred engine state by maximum and minimum achievable input torques corresponding to the input speed Ni(j) and determined as a function of barometric pressure and altitude. Data (not shown) comprising input speed-based calibrations of maximum and minimum achievable input torques for an exemplary engine operating in each of the engine states can be determined as a function of barometric pressure and altitude and implemented as algorithmic code. Thus, a preferred engine state comprising the engine state that achieves a minimum operating cost at a target or candidate input torque can be determined. This is now described.

Figure 12A:
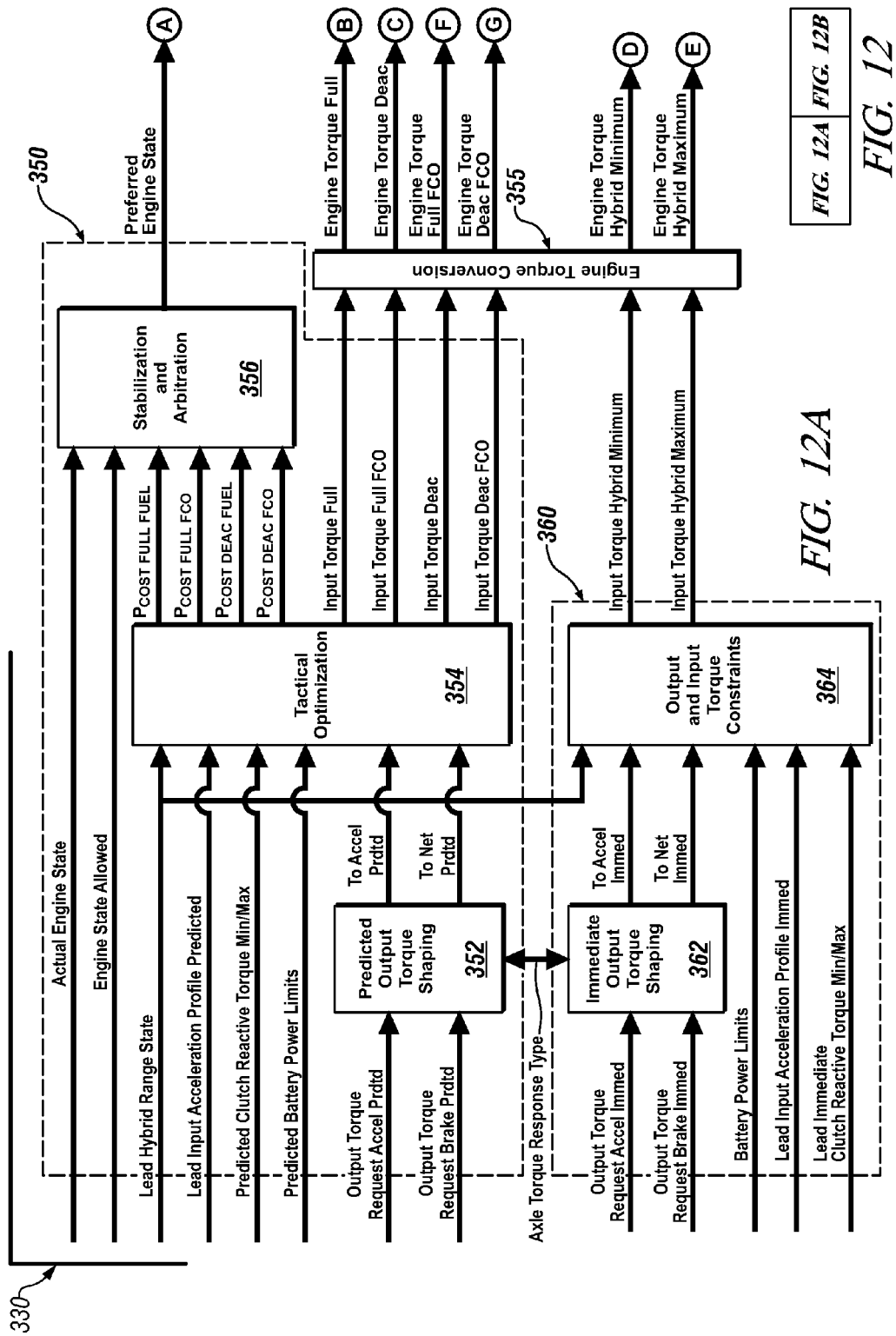
FIGS. 12 and 13 are schematic flow diagrams of a control scheme, in accordance with the present disclosure.
Figure 12B:
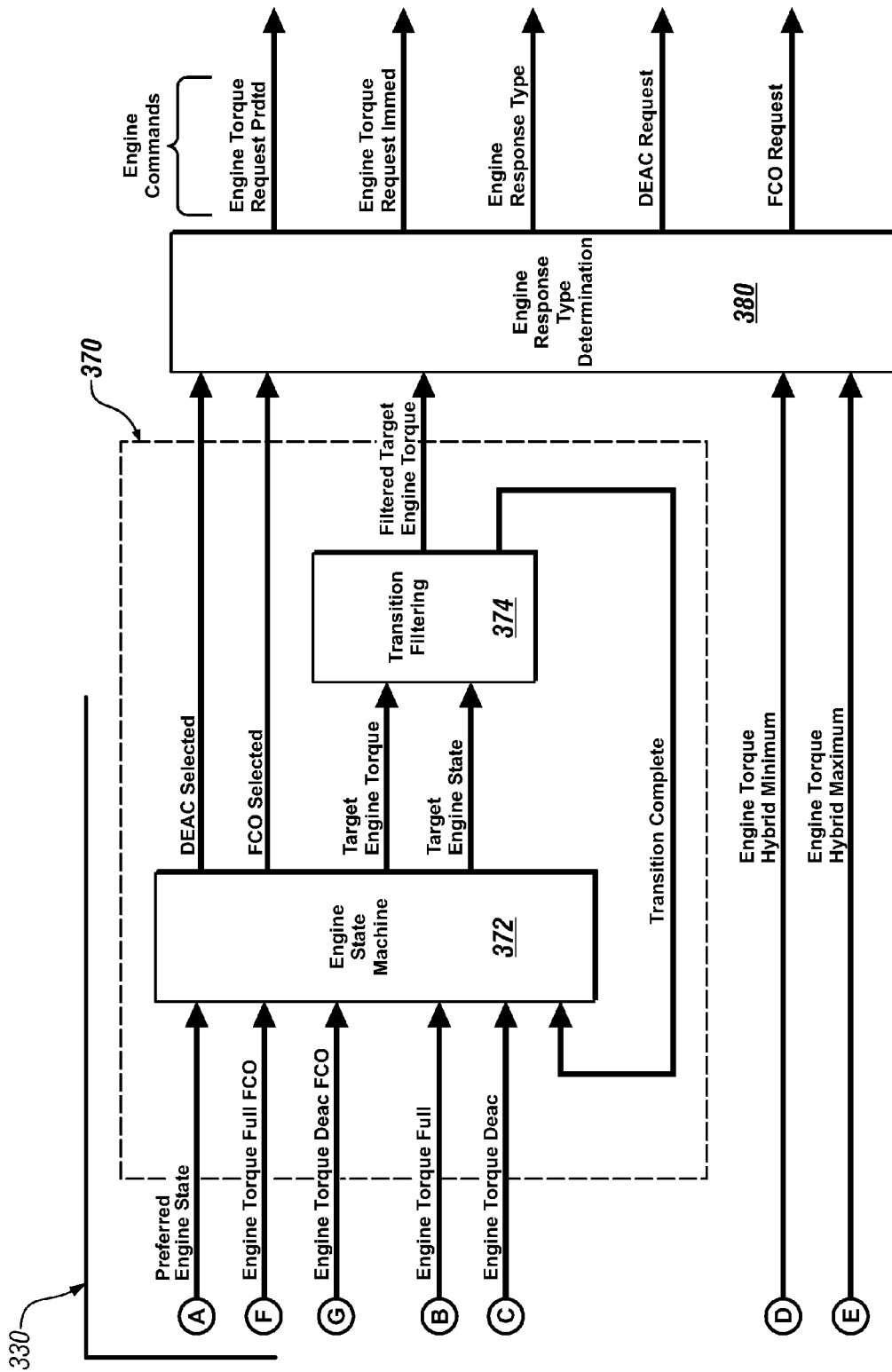

FIG. 12 details signal flow in the tactical control scheme ('Tactical Control and Operation') 330 for controlling operation of the engine 14, described with reference to the hybrid powertrain system of FIGS. 1 and 2 and the control system architecture of FIG. 3. The tactical control scheme 330 includes a tactical optimization control path 350 and a system constraints control path 360 which are preferably executed concurrently. The outputs of the tactical optimization control path 350 are input to an engine state control scheme 370. The outputs of the engine state control scheme 370 and the system constraints control path 360 are input to an engine response type determination scheme ('Engine Response Type Determination') 380 for controlling the engine state, the immediate engine torque request and the predicted engine torque request.

The operating point of the engine 14 as described in terms of the input torque and input speed that can be achieved by controlling mass of intake air to the engine 14 when the engine 14 comprises a spark-ignition engine by controlling position of an engine throttle (not shown) utilizing an electronic throttle control device (not shown). This includes opening the throttle to increase the engine input speed and torque output and closing the throttle to decrease the engine input speed and torque. The engine operating point can be achieved by adjusting ignition timing, generally by retarding spark timing from a mean-best-torque spark timing to decrease engine torque.

When the engine 14 comprises a compression-ignition engine, the operating point of the engine 14 can be achieved by controlling the mass of injected fuel, and adjusted by retarding injection timing from a mean-best-torque injection timing to decrease engine torque.

The engine operating point can be achieved by changing the engine state between the engine-off state and the engine-on state. The engine operating point can be achieved by controlling the engine state between the all-cylinder state and the cylinder deactivation state, wherein a portion of the engine cylinders are unfueled and the engine valves are deactivated. The engine state can include the fuel cutoff state wherein the engine is rotating and unfueled to effect engine braking.

The tactical optimization control path 350 acts on substantially steady state inputs to select a preferred engine state and determine a preferred input torque from the engine 14 to the transmission 10. The inputs originate in the shift execution and engine operating state control scheme 320. The tactical optimization control path 350 includes an optimization scheme ('Tactical Optimization') 354 to determine preferred input torques for operating the engine 14 in the all-cylinder state ('Input Torque Full'), in the cylinder deactivation state ('Input Torque Deac'), the all-cylinder state with fuel cutoff ('Input Torque Full FCO'), in the cylinder deactivation state with fuel cutoff ('Input Torque Deac FCO'), and a preferred engine state ('Preferred Engine State'). Inputs to the optimization scheme 354 include a lead operating range state of the transmission 10 ('Lead Hybrid Range State') a predicted lead input acceleration profile ('Lead Input Acceleration Profile Predicted'), a predicted range of clutch reactive torques ('Predicted Clutch Reactive Torque Min/Max') for each presently applied clutch, predicted battery power limits ('Predicted Battery Power Limits') and predicted output torque requests for acceleration ('Output Torque Request Accel Prdtd') and braking ('Output Torque Request Brake Prdtd'). The predicted output torque requests for acceleration and braking are combined and shaped with the axle torque response type through a predicted output torque shaping filter 352 to yield a predicted net output torque request ('To Net Prdtd') and a predicted accelerator output torque request ('To Accel Prdtd'), which are inputs to the optimization scheme 354. The lead operating range state of the transmission 10 comprises a time-shifted lead of the operating range state of the transmission 10 to accommodate a response time lag between a commanded change in the operating range state and a measured change in the operating range state. The predicted lead input acceleration profile comprises a time-shifted lead of the predicted input acceleration profile of the input member 12 to accommodate a response time lag between a commanded change in the predicted input acceleration profile and a measured change in the predicted input acceleration profile. The optimization scheme 354 determines costs for operating the engine 14 in the engine states, which comprise operating the engine fueled and in the all-cylinder state ('$P_{COST\ FULL\ FUEL}$'), operating the engine unfueled and in the all-cylinder state ('$P_{COST\ FULL\ FCO}$'), operating the engine fueled and in cylinder deactivation state ('$P_{COST\ DEAC\ FUEL}$'), and operating the engine unfueled and in the cylinder deactivation state ('$P_{COST\ DEAC\ FCO}$'). The aforementioned costs for operating the engine 14 are input to a stabilization analysis scheme ('Stabilization and Arbitration') 356 along with the actual engine state ('Actual Engine State') and an allowable or permissible engine state ('Engine State Allowed') to select one of the engine states as the preferred engine state ('Preferred Engine State').

The preferred input torques for operating the engine 14 in the all-cylinder state and in the cylinder deactivation state with and without fuel cutoff are input to an engine torque conversion calculator ('Engine Torque Conversion') 355 and converted to preferred engine torques in the all-cylinder state and in the cylinder deactivation state ('Engine Torque Full') and ('Engine Torque Deac') and with fuel cutoff in the all-cylinder state and in the cylinder deactivation state ('Engine Torque Full FCO') and ('Engine Torque Deac FCO') respectively, by taking into account parasitic and other loads introduced between the engine 14 and the transmission 10. The preferred engine torques for operation in the all-cylinder state and in the cylinder deactivation state and the preferred engine state comprise inputs to the engine state control scheme 370.

The costs for operating the engine 14 include operating costs which are generally determined based upon factors that include vehicle driveability, fuel economy, emissions, and battery usage. Costs are assigned and associated with fuel and electrical power consumption and are associated with a specific operating points of the hybrid powertrain. Lower operating costs are generally associated with lower fuel consumption at high conversion efficiencies, lower battery power usage, and lower emissions for each engine speed/load operating point, and take into account the present operating state of the engine 14.

The preferred engine state and the preferred engine torques in the all-cylinder state and in the cylinder deactivation state are input to the engine state control scheme 370, which includes an engine state machine ('Engine State Machine') 372. The engine state machine 372 determines a target engine torque ('Target Engine Torque') and a target engine state ('Target Engine State') based upon the preferred engine torques and the preferred engine state. The target engine torque and the target engine state are input to a transition filter ('Transition Filtering') 374 which monitors any commanded transition in the engine state and filters the target engine torque to provide a filtered target engine torque ('Filtered Target Engine Torque'). The engine state machine 372 outputs a command that indicates selection of one of the cylinder deactivation state and the all-cylinder state ('DEAC Selected') and indicates selection of one of the engine-on state and the deceleration fuel cutoff state ('FCO Selected').

The selection of one of the cylinder deactivation state and the all-cylinder state and the selection of one of the engine-on state and the deceleration fuel cutoff state, the filtered target engine torque, and the minimum and maximum engine torques are input to the engine response type determination scheme 380.

The system constraints control path 360 determines constraints on the input torque, comprising minimum and maximum input torques ('Input Torque Hybrid Minimum' and 'Input Torque Hybrid Maximum') that can be reacted by the transmission 10. The minimum and maximum input torques are determined based upon constraints to the transmission 10 and the first and second electric machines 56 and 72, including clutch torques and battery power limits, which affect the capacity of the transmission 10 to react input torque during the current loop cycle. Inputs to the system constraints control path 360 include the immediate output torque request as measured by the accelerator pedal 113 ('Output Torque Request Accel Immed') and the immediate output torque request as measured by the brake pedal 112 ('Output Torque Request Brake Immed') which are combined and shaped with the axle torque response type through an immediate output torque shaping filter ('Immediate Output Torque Shaping') 362 to yield a net immediate output torque ('To Net Immed') and an immediate accelerator output torque ('To Accel Immed'). The net immediate output torque and the immediate accelerator output torque are inputs to a constraints scheme ('Output and Input Torque Constraints') 364. Other inputs to the constraints scheme 364 include the lead operating range state of the transmission 10, an immediate lead input acceleration profile ('Lead Input Acceleration Profile Immed'), a lead immediate clutch reactive torque range ('Lead Immediate Clutch Reactive Torque Min/Max') for each presently applied clutch, and the available battery power ('Battery Power Limits') comprising the range $P_{BAT\_MIN}$ to $P_{BAT\_MAX}$. The immediate lead input acceleration profile comprises a time-shifted lead of the immediate input acceleration profile of the input member 12 to accommodate a response time lag between a commanded change in the immediate input acceleration profile and a measured change in the immediate input acceleration profile. The lead immediate clutch reactive torque range comprises a time-shifted lead of the immediate clutch reactive torque range of the clutches to accommodate a response time lag between a commanded change in the immediate clutch torque range and a measured change in the immediate clutch reactive torque range. The constraints scheme 364 determines an output torque range for the transmission 10, and then determines the minimum and maximum allowable input torques ('Input Torque Hybrid Minimum' and 'Input Torque Hybrid Maximum' respectively) that can be reacted by the transmission 10 based upon the aforementioned inputs. The minimum and maximum allowable input torques can change during ongoing operation, due to changes in the aforementioned inputs, including increasing energy recovery through electric power regeneration through the transmission 14 and first and second electric machines 56 and 72.

The minimum and maximum allowable input torques are input to the engine torque conversion calculator 355 and converted to minimum and maximum engine torques ('Engine Torque Hybrid Minimum' and 'Engine Torque Hybrid Maximum' respectively), by taking into account parasitic and other loads introduced between the engine 14 and the transmission 10.

The filtered target engine torque, the output of the engine state machine 372 and the minimum and maximum engine torques are input to the engine response type determination scheme 380, which inputs the engine commands to the ECM 23 for controlling the engine state, the immediate engine torque request and the predicted engine torque request. The engine commands include an immediate engine torque request ('Engine Torque Request Immed') and a predicted engine torque request ('Engine Torque Request Prdtd') that can be determined based upon the filtered target engine torque. Other commands control the engine state to one of the engine fueled state and the deceleration fuel cutoff state ('FCO Request') and to one of the cylinder deactivation state and the all-cylinder state ('DEAC Request'). Another output comprises an engine response type ('Engine Response Type'). When the filtered target engine torque is within the range between the minimum and maximum engine torques, the engine response type is inactive. When the filtered target engine torque is outside the constraints of the minimum and maximum engine torques ('Engine Torque Hybrid Minimum') and ('Engine Torque Hybrid Maximum') the engine response type is active, indicating a need for an immediate change in the engine torque, e.g., through engine spark control and retard to change the engine torque and the input torque to fall within the constraints of the minimum and maximum engine torques.

Figure 13B:
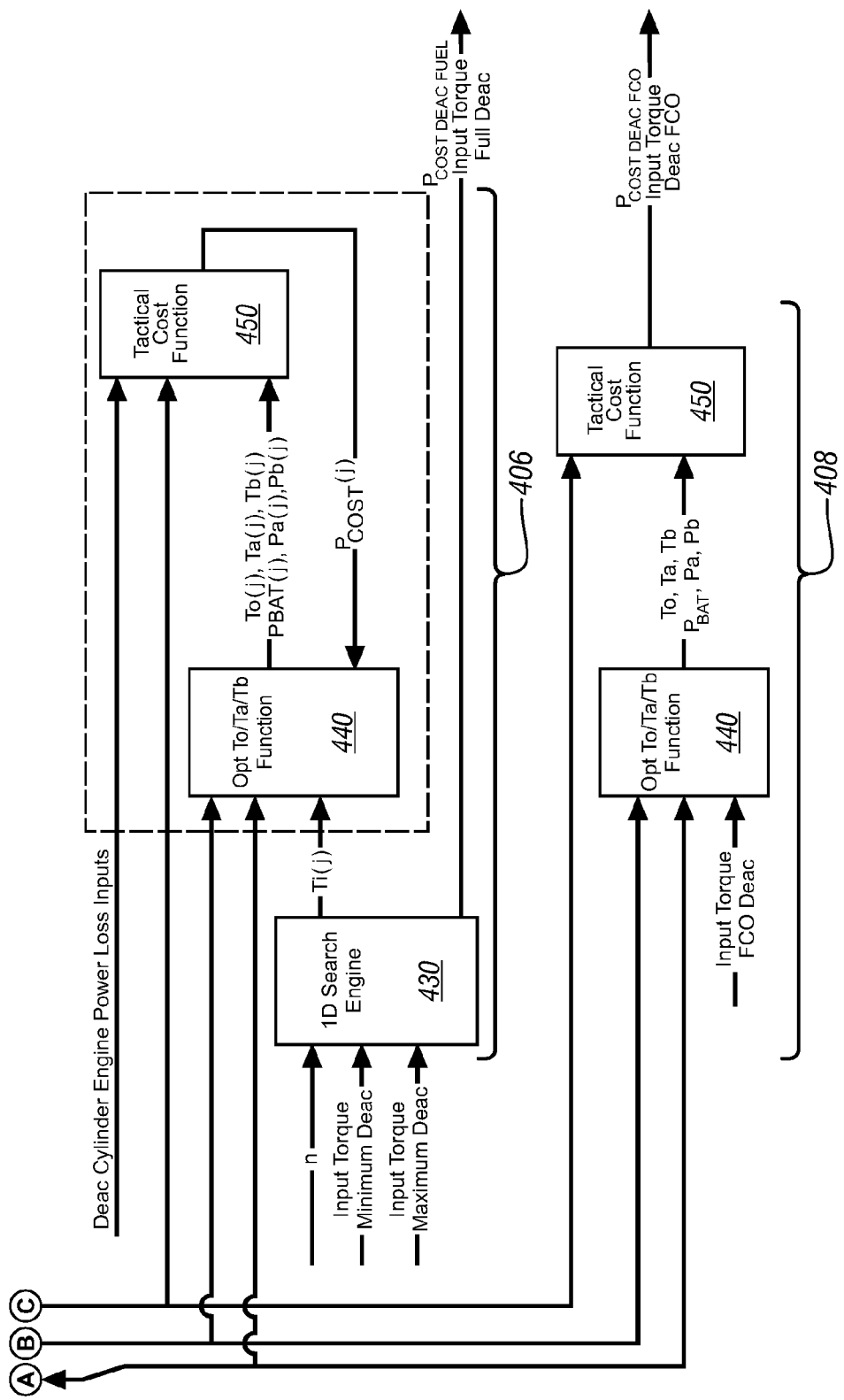

FIG. 13 shows details of the tactical optimization scheme 354 of the tactical optimization control path 350. The tactical optimization scheme ('Tactical Optimization') 354 is executed to determine preferred input torques and associated power costs for operating the engine 14 in the all-cylinder state ('Input Torque Full'), in the cylinder deactivation state ('Input Torque Deac'), the all-cylinder state with fuel cutoff ('Input Torque Full FCO'), and in the cylinder deactivation state with fuel cutoff ('Input Torque Deac FCO'). The system inputs to the tactical optimization scheme 354, as shown in FIG. 4, include the net predicted output torque ('To Net Prdtd') and the predicted accelerator output torque ('To Accel Prdtd'). In operation, the predicted accelerator output torque request ('Output Torque Request Accel Prdtd') and the predicted braking output torque request ('Output Torque Request Brake Prdtd') are monitored. The predicted output torque requests for acceleration and braking are combined and shaped with the axle torque response type through a predicted output torque shaping filter 352. The net predicted output torque comprises a sum of the operator torque requests communicated through the accelerator pedal 113 and the brake pedal 112. Other inputs include a lead operating range state of the transmission 10 ('Lead Hybrid Range State') a lead predicted input acceleration profile ('Lead Input Acceleration Profile Predicted'), a predicted range of clutch reactive torques ('Predicted Clutch Reactive Torque Min/Max') across each applied clutch in the lead operating range state, and predicted battery power limits ('Predicted Battery Power Limits').

The lead operating range state of the transmission 10 comprises a time-shifted lead of the operating range state of the transmission 10 to accommodate a response time lag, for example, between the engine torque request and the actual engine torque response. Thus the lead operating range state of the transmission 10 becomes the commanded operating range state. The lead predicted input acceleration profile comprises a time-shifted lead of the desired predicted input acceleration profile of the input member 12 to accommodate the response time lag. Thus the lead predicted input acceleration profile is the predicted input acceleration profile of the input member 12 occurring after the time shift. The parameters designated as 'lead' are used to accommodate concurrent transfer of torque through the powertrain converging at the common output member 64 using devices having varying response times. Specifically, the engine 14 can have a response time of an order of magnitude of 300-600 ms, and each of the torque transfer clutches C1 70, C2 62, C3 73, and C4 75 can have response times of an order of magnitude of 150-300 ms, and the first and second electric machines 56 and 72 can have response time of an order of magnitude of 10 ms.

The tactical optimization scheme 354 includes an optimization manager 420 which manages and generates power cost inputs, penalty costs, and optimization inputs for search schemes 402 and 406 and evaluation schemes 404 and 408. The search schemes 402 and 406 and evaluation schemes 404 and 408 determine preferred input torques and corresponding output torques at minimum power costs for operating the powertrain at each of the engine states.

The search scheme 402 executes a one-dimensional search of the input torque to determine a preferred input torque which minimizes power costs when operating the engine fueled and in the all-cylinder state. At each input torque, a preferred output torque is determined. This includes determining a range of input torques comprising minimum and maximum input torques with the engine 14 operating in the fueled state and in the all-cylinder state ('Input Torque Minimum Full', 'Input Torque Maximum Full') which are input to a one-dimensional search engine 430. The minimum and maximum input torques are the minimum and maximum achievable input torques determined for the input speed based upon the achievable minimum and maximum input torques determined based upon altitude or barometric pressure, as described in FIG. 10. The search engine 430 generates a candidate input torque ('Ti(j)') within the range of achievable input torques that is input to an optimization function 440. The optimization function 440 calculates outputs including an output torque ('To(j)') and torque outputs from the first and second electric machines 56 and 72 ('Ta(j)', 'Tb(j)'), and output power from the ESD 74 ('$P_{BAT}(j)$'), electrical power from the first and second electric machines 56 and 72 ('Pa(j)', 'Pb(j)') and clutch torque outputs ('Tcl1(j)'), ('Tcl2(j)') of applied clutches of the transmission device 10 based upon the candidate input torque and the optimization inputs and the system inputs. The outputs of the optimization function 440 are input to a cost function 450 which calculates a power cost ('$P_{COST}(j)$') for the candidate input torque. The search engine iteratively generates candidate input torques and executes over the range of achievable input torques to identify a preferred input torque and corresponding output torque which achieves a minimum power cost ('$P_{COST\ FULL\ FUEL}$') when operating the engine fueled and in the all-cylinder state.

The search scheme 406 executes a one-dimensional search of the input torque to determine a preferred input torque which minimizes power costs when operating the engine fueled and in the cylinder deactivation state. This includes determining a range of input torques comprising minimum and maximum input torques with the engine 14 operating in the fueled state and in the cylinder deactivation state ('Input Torque Minimum Deac', 'Input Torque Maximum Deac') which are input to the one-dimensional search engine 430. The minimum and maximum input torques are the minimum and maximum achievable input torques determined for the input speed based upon the achievable minimum and maximum input torques determined based upon altitude or barometric pressure, as described in FIG. 10. The search engine 430 generates a candidate input torque ('Ti(j)') within the range of achievable input torques that is input to the optimization function 440. The optimization function 440 calculates outputs including an output torque ('To(j)') and torque outputs from the first and second electric machines 56 and 72 ('Ta(j)', 'Tb(j)'), and output power from the ESD 74 ('$P_{BAT}(j)$') and electrical power from the first and second electric machines 56 and 72 ('Pa(j)', 'Pb(j)') based upon the candidate input torque and the optimization inputs and the system input. The outputs of the optimization function 440 are input to the cost function 450 which calculates a power cost ('$P_{COST}(j)$') for the candidate input torque ('Ti(j)'). The search engine iteratively generates candidate input torques and executes over the range of achievable input torques to identify a preferred input torque and corresponding output torque which achieves a minimum power cost ('$P_{COST\ DEAC\ FUEL}$') when operating the engine in the fueled state and in the cylinder deactivation state.

The evaluation scheme 404 evaluates the input torque to determine a preferred output torque and a power cost when operating the engine in the unfueled state and in the all-cylinder state. The candidate input torque ('Input Torque FCO Full') is input to the optimization function 440. The optimization function 440 calculates the outputs including an output torque ('To') and torque outputs from the first and second electric machines 56 and 72 ('Ta', 'Tb'), and output power from the ESD 74 ('$P_{BAT}$') and power from the first and second electric machines 56 and 72 ('Pa', 'Pb') based upon the input torque and the optimization inputs and the system inputs. The outputs of the optimization function 440 are input to the cost function 450 which calculates a power cost ('$P_{COST\ FULL\ FCO}$') when operating the engine unfueled and in the all-cylinder state.

The evaluation scheme 408 evaluates the input torque to determine a preferred output torque and a power cost when operating the engine in the unfueled state and in the cylinder deactivation state. The candidate input torque ('Input Torque FCO Deac') is input to the optimization function 440. The optimization function 440 calculates the outputs including an output torque ('To') and torque outputs from the first and second electric machines 56 and 72 ('Ta', 'Tb'), and output power from the ESD 74 ('$P_{BAT}$') and power from the first and second electric machines 56 and 72 ('Pa', 'Pb') based upon the input torque and the optimization inputs and the system inputs. The outputs of the optimization function 440 are input to the cost function 450 which calculates a power cost ('$P_{COST\ DEAC\ FCO}$') for the input torque when operating the engine unfueled and in the cylinder deactivation state.

The optimization function 440 has inputs including a single input torque, the optimization inputs and the system inputs. The system inputs include the net predicted output torque ('To Net Prdtd') and the predicted accelerator output torque ('To Accel Prdtd'). The optimization inputs include the lead operating range state of the transmission 10 ('Lead Hybrid Range State') the lead predicted input acceleration profile ('Lead Input Acceleration Profile Predicted'), the predicted range of clutch reactive torques ('Predicted Clutch Reactive Torque Min/Max') across each applied clutch in the lead operating range state, and predicted battery power limits ('Predicted Battery Power Limits'). Other limits include maximum and minimum motor torque outputs from the first and second electric machines 56 and 72, and system inertias, damping, clutch slippages, and electric/mechanical power conversion efficiencies. For each candidate input torque, the optimization function 440 calculates powertrain system outputs that are responsive to the system inputs comprising the aforementioned output torque commands and are within the maximum and minimum motor torque outputs from the first and second electric machines 56 and 72, and within the available battery power, and within the range of clutch reactive torques from the applied clutches for the present operating range state of the transmission 10, and take into account the system inertias, damping, clutch slippages, and electric/mechanical power conversion efficiencies. The powertrain system outputs include a maximum achievable output torque ('To') and achievable torque outputs from the first and second electric machines 56 and 72 ('Ta', 'Tb').

The cost function 450 determines power costs for operating the powertrain system responsive to the system inputs including the net predicted output torque and the predicted accelerator output torque and with the engine 14 at the candidate input torque. The power costs are determined based upon factors that include mechanical power loss in the form of friction and spin losses, electrical power losses related to heat generation, internal resistances, and current flow, and parasitic losses. During braking event, the power costs include kinetic power loss due to unrecovered kinetic energy that is expended in the form of heat generation in the friction brakes 94, which can be recovered as electric power through regenerative braking. Costs are assigned and associated with fuel and electrical power consumption and are associated with a specific operating point of the hybrid powertrain. Lower power costs are associated with lower fuel consumption at high conversion efficiencies, lower battery power usage, and lower emissions for each engine speed/load operating point, and take into account the present operating state of the engine 14. The search schemes 402 and 406 include additional power costs comprising engine power costs associated with operating the engine 14 in the all-cylinder fueled state ('Full Cylinder Engine Power Loss Inputs') and in the cylinder deactivation fueled state ('Deac Cylinder Engine Power Loss Inputs').

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method for controlling a vehicular powertrain system including an engine coupled to a transmission operative in one of a plurality of fixed gear and continuously variable operating range states to transfer power between the engine and an output member, the method comprising:
   monitoring an operator torque request;
   monitoring barometric pressure and engine input speed to the transmission;
   determining an achievable range of input power transferable from the engine to the transmission based upon the barometric pressure and the engine input speed; and
   selecting a preferred one of the operating range states for the transmission and a preferred engine operating point at the preferred operating range state based upon the operator torque request and the achievable range of input power.

2. The method of claim 1, further comprising determining a preferred engine input speed and a preferred engine state at the preferred operating range state based upon the operator torque request and the achievable range of input power.

3. The method of claim 2, wherein determining a preferred engine state comprises selecting one of all-cylinder operating state and a cylinder deactivation operating state.

4. The method of claim 2, wherein determining a preferred engine state comprises selecting one of a fueled state and a fuel cutoff state.

5. The method of claim 1, wherein selecting the preferred one of the operating range states for the transmission and the preferred engine operating point at the preferred operating range state based upon the operator torque request and the achievable range of input power comprises:
   executing searches of candidate engine operating points that are within the achievable range of input power transferable from the engine to the transmission for each of the operating range states and are responsive to the operator torque request;
   determining power costs for each of the candidate engine operating points for each of the operating range states; and
   selecting a preferred engine operating point and a preferred operating range state, wherein the preferred engine operating point and the preferred operating range state comprise the candidate engine operating point and the corresponding operating range state corresponding to a minimum of said power costs.

6. Method for controlling a powertrain system including a hybrid transmission operative in one of a plurality of operating range states to transfer power between an engine and a torque machine and an output member, the method comprising:
   monitoring an operator torque request;
   monitoring barometric pressure and engine input speed to the hybrid transmission;
   determining an achievable range of input power transferable from the engine to the hybrid transmission based upon the barometric pressure and the engine input speed; and
   determining a preferred operating range state for the hybrid transmission and a preferred engine operating point at the preferred operating range state based upon the operator torque request and the achievable range of input power.

7. The method of claim 6, further comprising controlling executing a shift to the preferred operating range state based upon the range of input power transferable from the engine to the hybrid transmission determined based upon the barometric pressure and the engine input speed.

8. The method of claim 1, further comprising operating the transmission at the preferred operating range state.

9. The method of claim 1, further comprising controlling executing a shift to the preferred operating range state based upon the range of input power transferable from the engine to the transmission determined based upon the barometric pressure and the engine input speed.

10. The method of claim 7, further comprising selecting a preferred operating range state comprising one of a fixed gear and a continuously variable operating range state.

11. The method of claim 6, further comprising determining a preferred engine input speed and a preferred engine state at the preferred operating range state based upon the operator torque request and the achievable range of input power.

12. The method of claim 11, wherein determining a preferred engine state comprises selecting one of an all-cylinder operating state and a cylinder deactivation operating state.

13. The method of claim 11, wherein determining a preferred engine state comprises selecting one of a including one of a fueled state and a fuel cutoff state.

14. The method of claim 6, wherein determining a preferred operating range state for the hybrid transmission and a preferred engine operating point at the preferred operating range state based upon the operator torque request and the achievable range of input power comprises:

executing searches of candidate engine operating points that are within the achievable range of input power transferable from the engine to the hybrid transmission for candidate operating range states;

determining power costs for operating the transmission for each candidate engine operating point for each candidate operating range state;

selecting a preferred engine operating point for each of the candidate operating range states comprising the candidate engine operating point having a minimum power cost; and selecting a preferred operating range state comprising the candidate operating range state corresponding to the preferred engine operating point having a minimum power cost.

15. Method for controlling a powertrain system including a hybrid transmission operative in one of a plurality of operating range states to transfer power between an engine and a torque machine and an output member, the method comprising:

monitoring an operator torque request;

monitoring barometric pressure and engine input speed to the hybrid transmission;

determining an achievable range of input power transferable from the engine to the hybrid transmission based upon the barometric pressure and the engine input speed;

determining a preferred operating range state for the hybrid transmission and a preferred engine operating point at the preferred operating range state based upon the operator torque request and the achievable range of input power; and executing a shift to the preferred operating range state based upon the range of input power transferable from the engine to the hybrid transmission determined based upon the barometric pressure and the engine input speed.

* * * * *